United States Patent
Shoa Hassani Lashdan et al.

(10) Patent No.: US 12,039,702 B2
(45) Date of Patent: Jul. 16, 2024

(54) MOTION COMPENSATION FOR NEURAL NETWORK ENHANCED IMAGES

(71) Applicant: QUALCOMM Incorporated, San Diego, CA (US)

(72) Inventors: Alireza Shoa Hassani Lashdan, Burlington (CA); Stone Yun, Markham (CA); Darren Gnanapragasam, Aurora (CA)

(73) Assignee: QUALCOMM Incorporated, San Diego, CA (US)

( * ) Notice: Subject to any disclaimer, the term of this patent is extended or adjusted under 35 U.S.C. 154(b) by 413 days.

(21) Appl. No.: 17/382,658

(22) Filed: Jul. 22, 2021

(65) Prior Publication Data
US 2023/0025778 A1    Jan. 26, 2023

(51) Int. Cl.
*G06T 3/02* (2024.01)
*G06N 3/02* (2006.01)
*G06T 1/20* (2006.01)
*G06T 3/4046* (2024.01)
*G06T 5/20* (2006.01)
*G06T 5/50* (2006.01)
*G06T 9/00* (2006.01)

(52) U.S. Cl.
CPC .................. *G06T 5/50* (2013.01); *G06N 3/02* (2013.01); *G06T 1/20* (2013.01); *G06T 3/4046* (2013.01); *G06T 5/20* (2013.01); *G06T 9/002* (2013.01); *G06T 2207/20084* (2013.01); *G06T 2207/20221* (2013.01)

(58) Field of Classification Search
CPC ........... G06T 5/50; G06T 1/20; G06T 3/4046; G06T 5/20; G06T 9/002; G06T 2207/20084; G06T 2207/20221; G06N 3/02; H04N 19/117; H04N 19/33; H04N 19/139
See application file for complete search history.

(56) References Cited

U.S. PATENT DOCUMENTS

| 10,621,695 B2 | 4/2020 | Schroers et al. |
| 10,701,394 B1 | 6/2020 | Caballero et al. |
| 2018/0144519 A1* | 5/2018 | Didow ................ G06T 11/60 |

(Continued)

OTHER PUBLICATIONS

International Search Report and Written Opinion—PCT/US2022/073927—ISA/EPO—dated Nov. 11, 2022.

(Continued)

*Primary Examiner* — Said M Elnoubi
(74) *Attorney, Agent, or Firm* — QUALCOMM Incorporated; Espartaco Diaz Hidalgo

(57) ABSTRACT

A device includes a memory and one or more processors. The memory is configured to store instructions. The one or more processors are configured to execute the instructions to apply a neural network to a first image to generate an enhanced image. The one or more processors are also configured to execute the instructions to adjust at least a portion of a high-frequency component of the enhanced image based on a motion compensation operation to generate an adjusted high-frequency image component. The one or more processors are further configured to execute the instructions to combine a low-frequency component of the enhanced image and the adjusted high-frequency image component to generate an adjusted enhanced image.

29 Claims, 15 Drawing Sheets

(56) References Cited

U.S. PATENT DOCUMENTS

| | | | |
|---|---|---|---|
| 2018/0262754 A1* | 9/2018 | Komi | H04N 19/577 |
| 2020/0177898 A1 | 6/2020 | Park et al. | |
| 2020/0186809 A1 | 6/2020 | Mukherjee et al. | |
| 2020/0294217 A1 | 9/2020 | El-Khamy et al. | |
| 2021/0021823 A1 | 1/2021 | Na et al. | |
| 2023/0019851 A1* | 1/2023 | Yi | G06N 3/0475 |

OTHER PUBLICATIONS

Kotra (Qualcomm) A.M., et al., "AHG11: Neural Network-based Super Resolution", 21. JVET Meeting, Jan. 6, 2021-Jan. 15, 2021, Teleconference, (The Joint Video Exploration Team of ISO/IEC JTC1/SC29/WG11 and ITU-T SG.16), No. JVET-U0099, 6 Pages, Jan. 7, 2021, XP030293236, the whole document.

Ledig et al., "Photo-Realistic Single Image Super-Resolution Using a Generative Adversarial Network", May 25, 2017, pp. 1-19.

* cited by examiner

MOTION COMPENSATION FOR NEURAL NETWORK ENHANCED IMAGES

I. FIELD

The present disclosure is generally related to applying motion compensation to enhanced images.

II. DESCRIPTION OF RELATED ART

Advances in technology have resulted in smaller and more powerful computing devices. For example, there currently exist a variety of portable personal computing devices, including wireless telephones such as mobile and smart phones, tablets and laptop computers that are small, lightweight, and easily carried by users. These devices can communicate voice and data packets over wireless networks. Further, many such devices incorporate additional functionality such as a digital still camera, a digital video camera, a digital recorder, and an audio file player. Also, such devices can process executable instructions, including software applications, such as a web browser application, that can be used to access the Internet. As such, these devices can include significant computing capabilities.

Such computing devices often incorporate functionality to display images. For example, an image stream may include downscaled low-resolution images that represent video content. To illustrate, the image stream may be received (e.g., downloaded) from another device and may include the low-resolution images to meet transmission bandwidth limitations. As another example, the image stream may be generated at a lower resolution (e.g., by a camera or a graphics processor) and is to be displayed at a higher resolution. Super resolution upscaling can be used to reconstruct a high-resolution image from a low-resolution image. The reconstructed high-resolution image has added texture that does not exist in the low-resolution image. However, the added texture can be inconsistent across image frames, resulting in visible flicker for video.

III. SUMMARY

According to one implementation of the present disclosure, a device includes a memory and one or more processors. The memory is configured to store instructions. The one or more processors are configured to execute the instructions to apply a neural network to a first image to generate an enhanced image. The one or more processors are also configured to execute the instructions to adjust at least a portion of a high-frequency component of the enhanced image based on a motion compensation operation to generate an adjusted high-frequency image component. The one or more processors are further configured to execute the instructions to combine a low-frequency component of the enhanced image and the adjusted high-frequency image component to generate an adjusted enhanced image.

According to another implementation of the present disclosure, a method includes applying, at a device, a neural network to a first image to generate an enhanced image. The method also includes adjusting, at the device, at least a portion of a high-frequency component of the enhanced image based on a motion compensation operation to generate an adjusted high-frequency image component. The method further includes combining, at the device, a low-frequency component of the enhanced image and the adjusted high-frequency image component to generate an adjusted enhanced image.

According to another implementation of the present disclosure, a non-transitory computer-readable medium includes instructions that, when executed by one or more processors, cause the one or more processors to apply a neural network to a first image to generate an enhanced image. The instructions, when executed by the one or more processors, also cause the one or more processors to adjust at least a portion of a high-frequency component of the enhanced image based on a motion compensation operation to generate an adjusted high-frequency image component. The instructions, when executed by the one or more processors, further cause the one or more processors to combine a low-frequency component of the enhanced image and the adjusted high-frequency image component to generate an adjusted enhanced image.

According to another implementation of the present disclosure, an apparatus includes means for applying a neural network to a first image to generate an enhanced image. The apparatus also includes means for adjusting at least a portion of a high-frequency component of the enhanced image based on a motion compensation operation to generate an adjusted high-frequency image component. The apparatus further includes means for combining a low-frequency component of the enhanced image and the adjusted high-frequency image component to generate an adjusted enhanced image.

Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

V. DETAILED DESCRIPTION

Figure 1:
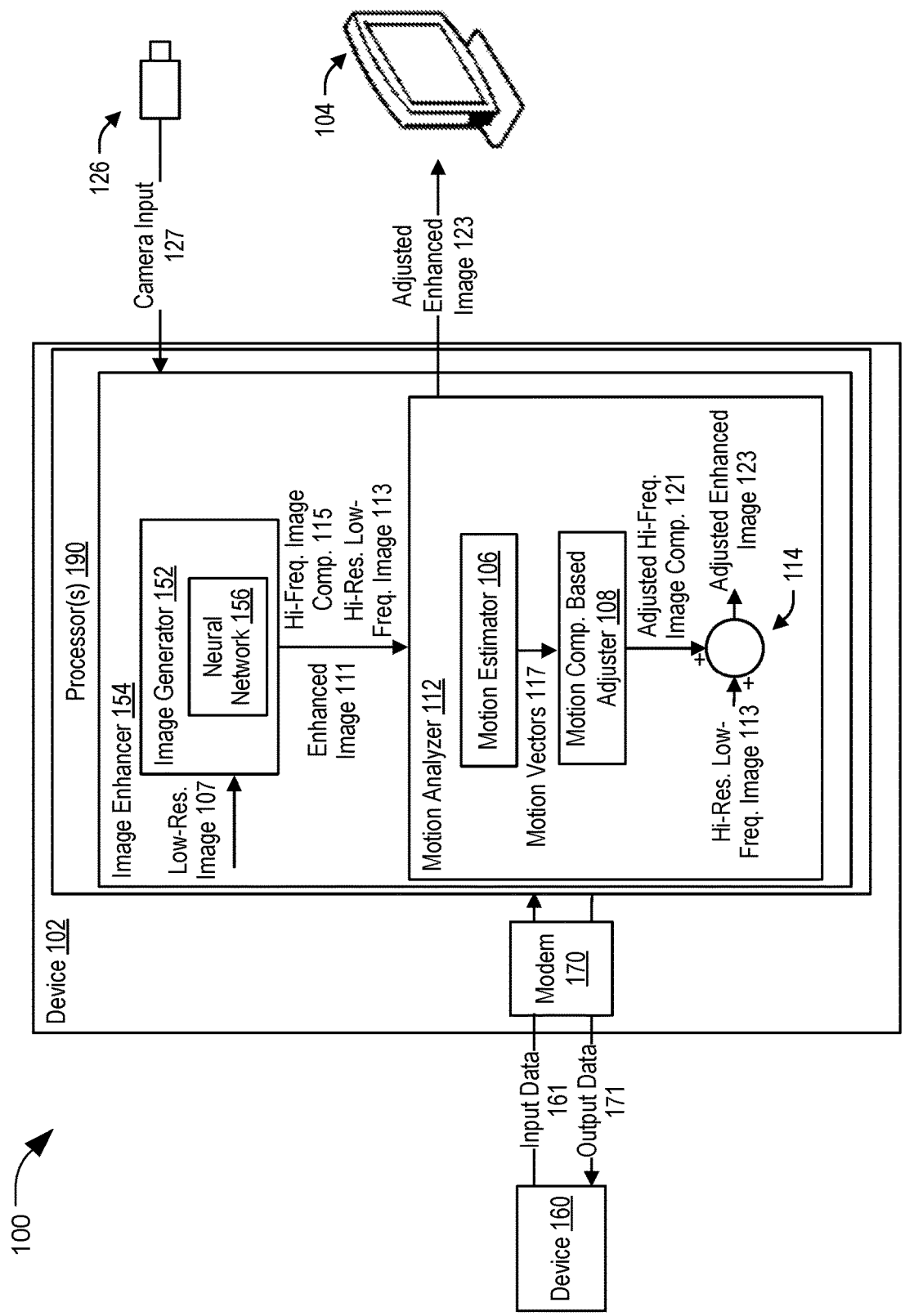
FIG. 1 is a block diagram of a particular illustrative aspect of a system operable to perform motion compensation for neural network enhanced images, in accordance with some examples of the present disclosure.

Upscaling is a technique that can be used to generate a high-resolution image from a low-resolution image. The high-resolution image can have added texture that does not exist in the low-resolution image. However, the added texture can be inconsistent across image frames and can result in visible flicker for a person viewing upscaled video, which can be distracting and can impair a user experience.

Systems and methods of performing motion compensation for neural network enhanced images is disclosed. For example, an image enhancer includes an image generator and a motion analyzer. The image generator uses a neural network to generate an enhanced image from a low-resolution image. For example, the neural network is used to upscale and add texture to the low-resolution image to generate the enhanced image. The enhanced image can be referred to as a high-resolution image.

As used herein, "low-resolution" and "high-resolution" are relative terms. In a first example, a first image having a first resolution (e.g., corresponding to 1080p) is upscaled to generate a second image having a second resolution (e.g., corresponding to 7680p). In this example, the first image can be referred to as a low-resolution image and the second image can be referred to as a high-resolution image. In a second example, a first image having a first resolution (e.g., corresponding to 480p) is upscaled to generate a second image having a second resolution (e.g., corresponding to 1080p). In this example, the first image can be referred to as a low-resolution image and the second image can be referred to as a high-resolution image. Thus, an image having a particular resolution (e.g., corresponding to 1080p) can be considered low-resolution in some implementations and high-resolution in other implementations.

The image generator also identifies a high frequency component of the enhanced image. In a particular example, a high frequency component of the enhanced image corresponds to a difference between the enhanced image and an upscaled version of the low-resolution image. In another example, the image generator applies a low pass filter to the enhanced image to extract the high frequency component.

The motion analyzer estimates motion information indicating motion between a current image frame (e.g., the low-resolution image) and a previous image frame (e.g., a previous low-resolution image). The motion analyzer performs motion compensation on a previous high frequency component (e.g., a previous adjusted high-frequency component) based on the motion information to generate a predicted high frequency component. The motion analyzer generates an adjusted high frequency component based on the predicted high frequency component and the high frequency component extracted from the enhanced image. For example, the motion analyzer adjusts the extracted high frequency component based on the predicted high frequency component to generate the adjusted high frequency component. In some examples, the motion analyzer performs temporal filtering based on the predicted high frequency component and the extracted high frequency component to generate the adjusted high frequency component.

The motion analyzer combines a low frequency component of the enhanced image with the adjusted high frequency component to generate an adjusted enhanced image. Applying the motion compensation and the temporal filtering on the high frequency components (rather than the entire image frame) avoids over-filtering artifacts in low frequency components since those artifacts can be more visible in low frequencies.

Particular aspects of the present disclosure are described below with reference to the drawings. In the description, common features are designated by common reference numbers. As used herein, various terminology is used for the purpose of describing particular implementations only and is not intended to be limiting of implementations. For example, the singular forms "a," "an," and "the" are intended to include the plural forms as well, unless the context clearly indicates otherwise. Further, some features described herein are singular in some implementations and plural in other implementations. To illustrate, FIG. 1 depicts a device 102 including one or more processors ("processor(s)" 190 of FIG. 1), which indicates that in some implementations the device 102 includes a single processor 190 and in other implementations the device 102 includes multiple processors 190.

As used herein, the terms "comprise," "comprises," and "comprising" may be used interchangeably with "include," "includes," or "including." Additionally, the term "wherein" may be used interchangeably with "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to one or more of a particular element, and the term "plurality" refers to multiple (e.g., two or more) of a particular element.

As used herein, "coupled" may include "communicatively coupled," "electrically coupled," or "physically coupled," and may also (or alternatively) include any combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive signals (e.g., digital signals or analog signals) directly or indirectly, via one or more wires, buses, networks, etc. As used herein, "directly coupled" may include two devices that are coupled (e.g., communicatively coupled, electrically coupled, or physically coupled) without intervening components.

In the present disclosure, terms such as "determining," "calculating," "estimating," "shifting," "adjusting," etc. may be used to describe how one or more operations are performed. It should be noted that such terms are not to be construed as limiting and other techniques may be utilized to perform similar operations. Additionally, as referred to herein, "generating," "calculating," "estimating," "using," "selecting," "accessing," and "determining" may be used interchangeably. For example, "generating," "calculating," "estimating," or "determining" a parameter (or a signal) may refer to actively generating, estimating, calculating, or determining the parameter (or the signal) or may refer to using, selecting, or accessing the parameter (or signal) that is already generated, such as by another component or device.

Referring to FIG. 1, a particular illustrative aspect of a system 100 configured to perform motion compensation for neural network enhanced images is disclosed. The system 100 includes a device 102 that is coupled to a display device 104, a camera 126, a device 160, or a combination thereof. The device 102 is configured to perform motion compensation for neural network enhanced images using an image enhancer 154.

The device 102 includes one or more processors 190 that include the image enhancer 154. The image enhancer 154 includes an image generator 152 coupled to a motion analyzer 112. In some implementations, the one or more processors 190 are configured to receive camera input 127 from the camera 126, output an adjusted enhanced image 123 to the display device 104, or both. A modem 170 is coupled to the one or more processors 190 and is configured to enable communication with the device 160, such as to receive a first bitstream including input data 161, to send a second bitstream including output data 171, or both, via wireless transmission.

The image enhancer 154 is configured to process a low-resolution image 107 to generate the adjusted enhanced image 123. In some implementations, the low-resolution image 107 corresponds to the input data 161 received from the device 160. For example, the device 160 downscales image data (e.g., video content, a photo burst, animated content, etc.) to generate downscaled data, and compresses the downscaled data to generate the input data 161. A decoder of the one or more processors 190 decompresses the input data 161 to generate the low-resolution image 107. In some implementations, the camera input 127 (e.g., video content, a photo burst, etc.) includes the low-resolution image 107. For example, the image enhancer 154 is configured to retrieve the low-resolution image 107 from a camera buffer. In some implementations, the low-resolution image 107 is generated by the one or more processors 190 (e.g., a graphics processing unit (GPU), a game application, a video editing application, etc.). In an example, the image enhancer 154 is configured to retrieve the low-resolution image 107 from a GPU buffer.

The image generator 152 is configured to process the low-resolution image 107 to generate an enhanced image 111. The image generator 152 includes a neural network 156 (e.g., a super resolution generative adversarial network (SRGAN)) configured to process the low-resolution image 107 (e.g., a current image frame) to generate the enhanced image 111 (e.g., upscaled and with added texture), as further described with reference to FIGS. 2A-3A and 3C. The image generator 152 is also configured to generate a high frequency (hi-freq.) image component (comp.) 115 (e.g., the added texture), a high-resolution (hi-res.) low frequency (low-freq.) image 113 (e.g., current image frame upscaled), or both, as further described with reference to FIGS. 2A-3C. In some implementations, the neural network 156 is configured to process the low-resolution image 107 (e.g., a current image frame) to generate the high-frequency image component 115 (e.g., the added texture), as further described with reference to FIGS. 2A-2B and 3B. In these implementations, the image generator 152 is configured to generate the enhanced image 111 (e.g., upscaled and with added texture) based on the high-frequency image component 115 (e.g., the added texture) and the high-resolution low-frequency image 113 (e.g., the current image frame upscaled).

The motion analyzer 112 is configured to process the enhanced image 111 to generate the adjusted enhanced image 123, as further described with reference to FIGS. 2A-2C, 4, and 5. In a particular example, the motion analyzer 112 includes a motion estimator 106 coupled via a motion compensation based adjuster 108 to a combiner 114. The motion estimator 106 is configured to generate motion vectors 117 by performing motion analysis based on a current image frame (e.g., the low resolution image 107 or the high-resolution low-frequency image 113) and a previous image frame (e.g., a previous low resolution image or a previous high-resolution low-frequency image), as further described with reference to FIGS. 4-5.

The motion compensation based adjuster 108 is configured to adjust the high-frequency image component 115 (e.g., the added texture) based on the motion vectors 117 to generate an adjusted high-frequency image component 121, as further described with reference to FIGS. 4-5. For example, the motion compensation based adjuster 108 is configured to generate a predicted high-frequency image component by applying motion compensation on a previous high-frequency image component to generate a predicted high-frequency image component. The motion compensation based adjuster 108 is configured to perform temporal filtering based on the predicted high-frequency image component and the high-frequency image component 115 (e.g., the added texture) to generate the adjusted high-frequency image component 121, as further described with reference to FIGS. 4-5. For example, the motion compensation based adjuster 108 adjusts the high-frequency image component 115 based on the predicted high-frequency image component (e.g., that is based on a motion compensation operation) to generate the adjusted high-frequency image component 121. The combiner 114 is configured to combine the high-resolution low-frequency image 113 (e.g., current image frame upscaled) and the adjusted high-frequency image component 121 (e.g., the adjusted added texture) to generate the adjusted enhanced image 123.

In some implementations, the motion compensation based adjuster 108 selectively applies temporal filtering based on accuracy of the motion vectors 117, as further described with reference to FIGS. 4-5. As an example, the motion compensation based adjuster 108 applies motion compensation to a previous image frame based on the motion vectors 117 to generate a predicted image frame and determines the accuracy of the motion vectors 117 based on the predicted image frame and a current image frame (e.g., the low resolution image 107 or the enhanced image 111), as described with reference to FIGS. 4-5. The motion compensation based adjuster 108 applies temporal filtering if the motion vectors 117 appear to be accurate. Alternatively, the motion compensation based adjuster 108 refrains from applying temporal filter if the motion vectors 117 appear to be inaccurate. To illustrate, if the motion vectors 117 appear to be inaccurate, the adjusted high-frequency image component 121 corresponds to the high-frequency image component 115 (e.g., no adjustment) and the adjusted enhanced image 123 corresponds to the enhanced image 111 (e.g., no adjustment). In some implementations, the motion compensation based adjuster 108 determines whether to apply temporal filtering on a pixel-by-pixel basis.

In a particular aspect, the motion compensation based adjuster 108 is configured to selectively generate the adjusted enhanced image 123. For example, the motion compensation based adjuster 108 determines a motion metric based on the motion vectors 117 (e.g., without performing motion compensation based on the motion vectors 117 to generate a predicted image frame) and determines, based on the motion metric, whether to generate the adjusted enhanced image 123. For example, the motion compensation based adjuster 108, based on the motion metric, bypasses the motion compensation and temporal filtering (e.g., refrains from generating the adjusted enhanced image 123) and outputs the enhanced image 111. The motion metric (e.g., a sum of motion vectors) indicates motion associated with the low resolution image 107. The motion compensation based adjuster 108, based on the motion indicated by the motion metric, determines whether to generate the adjusted enhanced image 123. In a particular implementation, the motion compensation based adjuster 108, in response to determining that the motion metric indicates that the motion satisfies a motion criterion, adjusts the high-frequency image component 115 to generate the adjusted high-frequency image component 121 and generates the adjusted enhanced image 123 based on the adjusted high-frequency image component 121. Alternatively, the motion compensation based adjuster 108, in response to determining that the motion metric indicates that the motion fails to satisfy the motion criterion, refrains from generating the adjusted enhanced image 123 and outputs the enhanced image 111 as the next output image in an output stream. For example, the motion compensation based adjuster 108 provides the enhanced image 111 to the display device 104, the device 160, a memory, another device, or a combination thereof. In a particular aspect, the motion compensation based adjuster 108 determines that the motion satisfies the motion criterion in response to determining that the motion is less than a motion threshold (e.g., 5 pixels). For example, artifacts can be less visible in the presence of large motion (e.g., greater than or equal to 5 pixels). In such cases, the motion compensation and temporal filtering (e.g., generating the adjusted enhanced image 123) can be bypassed to conserve resources because the less visible artifacts have a limited (if any) adverse impact on video quality and user experience.

In some implementations, the device 102 corresponds to or is included in one of various types of devices. In an illustrative example, the one or more processors 190 are integrated in at least one of a mobile phone or a tablet computer device, as described with reference to FIG. 10, a wearable electronic device, as described with reference to FIG. 11, a camera device, as described with reference to FIG. 12, or a virtual reality, mixed reality, or augmented reality headset, as described with reference to FIG. 13. In another illustrative example, the one or more processors 190 are integrated into a vehicle, such as described further with reference to FIG. 14 and FIG. 15.

During operation, the image enhancer 154 accesses (e.g., receives or retrieves) the low-resolution image 107. In a particular example, the image enhancer 154 receives input data 161 via the modem 170 from the device 160. The one or more processors 190 generate the low-resolution image 107 based on the input data 161 and provide the low-resolution image 107 to the image enhancer 154, as further described with reference to FIG. 7. In another example, the image enhancer 154 receives the low-resolution image 107 from the camera 126. In a further example, the image enhancer 154 receives the low-resolution image 107 from the one or more processors 190 (e.g., a GPU).

In a particular implementation, the image enhancer 154 receives an image enhancement request from an application (e.g., a video editing application, a gaming application, a presentation application, etc.). The image enhancer 154, in response to receiving the image enhancement request, retrieves the low-resolution image 107 from a buffer. In a particular aspect, the image enhancer 154 has access to multiple buffers. The image enhancer 154 selects a particular buffer based on the image enhancement request, a type of the application, or both, and retrieves the low-resolution image 107 from the selected buffer. For example, the image enhancer 154, in response to determining that the application is of a first type (e.g., a gaming application) or that the image enhancement request indicates a GPU buffer, retrieves the low-resolution image 107 from the GPU buffer. As another example, the image enhancer 154, in response to determining that the application is of a second type (e.g., a video editing application) or that the image enhancement request indicates a camera buffer, retrieves the low-resolution image 107 from the camera buffer.

The image generator 152 applies the neural network 156 (e.g., SRGAN) to the low-resolution image 107 (e.g., the current image frame) to generate the enhanced image 111 (e.g., upscaled and with added texture), as further described with reference to FIGS. 2A-3A and 3C. The image generator 152 generates the high-resolution low-frequency image 113 (e.g., the current image frame upscaled) of the enhanced image 111 and the high-frequency image component 115 (e.g., the added texture) of the enhanced image 111, as further described with reference to FIGS. 2A-3C.

In some implementations, the image generator 152 applies the neural network 156 to the low-resolution image 107 (e.g., the current image frame) to generate the high-frequency image component 115 (e.g., the added texture), as further described with reference to FIGS. 2A-2B and 3B. In these implementations, the image generator 152 generates the enhanced image 111 (e.g., upscaled and with added texture) based on the high-frequency image component 115 (e.g., the added texture) and the high-resolution low-frequency image 113 (e.g., the current image frame upscaled). The image generator 152 provides the enhanced image 111 (e.g., upscaled and with added texture), the high-resolution low-frequency image 113 (e.g., upscaled), the high-frequency image component 115 (e.g., the added texture), or a combination thereof, to the motion analyzer 112.

The motion analyzer 112 performs a motion compensation operation on a previous high-frequency image component to generate a predicted high-frequency image component. In a particular aspect, the motion analyzer 112 adjusts the high-frequency image component 115 (e.g., the added texture) of the enhanced image 111 based on the predicted high-frequency image component to generate an adjusted high-frequency image component 121 (e.g., motion adjusted added texture). For example, the motion estimator 106 generates motion vectors 117 based on a comparison of the high-resolution low-frequency image 113 (e.g., current image upscaled) and a previous high-resolution low-frequency image (e.g., previous image upscaled), as described with reference to FIG. 4. In another example, the motion estimator 106 generates the motion vectors 117 based on a comparison of the low-resolution image 107 and a previous low-resolution image (e.g., a previous image frame), as further described with reference to FIG. 5. Generating the motion vectors 117 based on the low-resolution images may use fewer resources (e.g., time and computation cycles). The use of the motion vectors 117 to indicate motion information are provided as an illustrative example. In some examples, other types of data may be used to indicate the motion information.

The motion estimator 106 provides the motion vectors 117 to the motion compensation based adjuster 108. In some implementations, the motion compensation based adjuster 108 determines, based on the motion vectors 117, whether the adjusted enhanced image 123 is to be generated. For examples, the motion compensation based adjuster 108 determines a motion metric based on the motion vectors 117. The motion analyzer 112, in response to determining that the motion metric indicates motion that fails to satisfy a motion criterion, refrains from generating the adjusted enhanced image 123 and outputs the enhanced image 111 as an output image in an output stream. Alternatively, the motion compensation based adjuster 108, in response to determining that the motion metric indicates motion that satisfies the motion criterion, proceeds to generate the adjusted enhanced image 123. In a particular aspect, the motion compensation based adjuster 108, in response to determining that the motion is greater than or equal to a first motion threshold, less than or equal to a second motion threshold, or both, determines that the motion satisfies the motion criterion.

The motion compensation based adjuster 108 adjusts at least a portion of the high-frequency image component 115 of the enhanced image 111 based on a motion compensation operation to generate the adjusted high-frequency image component 121, as further described with reference to FIGS. 4-5. For example, the motion compensation based adjuster 108 generates a predicted high-frequency image component by performing a motion compensation operation on a previous high-frequency image component and adjusts at least a portion of the high-frequency image component 115 based on the predicted high-frequency image component to generate the adjusted high-frequency image component 121.

In a particular example, the motion compensation based adjuster 108 uses a temporal filter based on the predicted high-frequency image component to adjust at least the portion of the high-frequency image component 115, as further described with reference to FIGS. 4-5. In a particular aspect, the motion compensation based adjuster 108 performs temporal filtering of the high-frequency image component 115 (e.g., the added texture) and the predicted high-frequency image component based on an estimated accuracy of the motion vectors 117, as further described with reference to FIGS. 4-5. For example, the motion analyzer 112 applies motion compensation to a previous image frame based on the motion vectors 117 to generate a predicted image frame, as further described with reference to FIGS. 4-5. The motion analyzer 112 determines an accuracy of the motion vectors 117 (e.g., as indicated by a blending factor) based on a comparison of the predicted image frame and a current image frame (e.g., the low resolution image 107 or the enhanced image 111), as described with reference to FIGS. 4-5. For example, a closer match between the predicted image frame and the current image frame indicates a higher accuracy of the motion vectors 117. The motion analyzer 112 applies temporal filtering to generate the adjusted high-frequency image component 121 based on the accuracy of the motion vectors 117, the predicted high-frequency image component, and the high-frequency image component 115 (e.g., the added texture). For example, the adjusted high-frequency image component 121 corresponds more closely to the predicted high-frequency image component when the motion vectors 117 are more accurate. Alternatively, the adjusted high-frequency image component 121 corresponds more closely to the high-frequency image component 115 when the motion vectors 117 are less accurate. The motion analyzer 112 thus filters (e.g., reduces or removes) temporally inconsistent added texture or noise to generate the adjusted high-frequency image component 121.

In some aspects, a previous image frame (e.g., a previous low-resolution image) may be prior to a current image frame (e.g., the low-resolution image 107) in a playback time sequence of the plurality of images. In another aspect, the previous image frame may be subsequent to the current image frame in the playback time sequence of the plurality of images. In a particular aspect, the previous image frame refers to an image frame that is most recently processed by the image enhancer 154 prior to processing the current image frame (e.g., low resolution image 107). The combiner 114 combines the adjusted high-frequency image component 121 (e.g., the adjusted added texture) and the high-resolution low-frequency image 113 of the enhanced image 111 to generate the adjusted enhanced image 123.

Generating the adjusted high-frequency image component 121 based on a single blending factor that is generated based on a frame-wise comparison (e.g., of the predicted image frame and the current image frame) is provided as an illustrative example. In other examples, the motion analyzer 112 determines an accuracy of the motion vectors 117 (e.g., as indicated by a plurality of blending factors) based on a comparison of portions of the predicted image frame and corresponding portions of the current image frame (e.g., the low resolution image 107 or the enhanced image 111). For example, the motion analyzer 112 determines a first blending factor based on a comparison of a first portion of the predicted image frame and a corresponding first portion of the current image frame, a second blending factor based on a comparison of a second portion of the predicted image frame and a corresponding second portion of the current image frame, and so on. The motion analyzer 112 applies temporal filtering to generate a first portion of the adjusted high-frequency image component 121 based on the first blending factor, a first portion of the predicted high-frequency image component, and a first portion of the high-frequency image component 115 (e.g., the added texture). Similarly, the motion analyzer 112 applies temporal filtering to generate a second portion of the adjusted high-frequency image component 121 based on the second blending factor, a second portion of the predicted high-frequency image component, and a second portion of the high-frequency image component 115 (e.g., the added texture). Various portions of the adjusted high-frequency image component 121 may thus be temporally filtered based on different blending factors corresponding to accuracy of local motion vectors.

In a particular aspect, the adjusted enhanced image 123 thus retains any added texture generated by the neural network 156 in the low-frequency portion (e.g., the high-resolution low-frequency image 113) of the enhanced image 111 and includes motion adjusted added texture for the high-frequency portion (e.g., the adjusted high-frequency image component 121) of the adjusted enhanced image 123 to reduce jitter relative to a previous adjusted enhanced image generated by the image enhancer 154.

In a particular aspect, the image enhancer 154 is configured to generate output data 171 based on the adjusted enhanced image 123 and provide the output data 171 via the modem 170 to the device 160, as further described with reference to FIG. 6. In a particular aspect, the image enhancer 154 provides the adjusted enhanced image 123 to the display device 104 and the display device 104 displays an output image that is based on the adjusted enhanced image 123. In a particular aspect, the image enhancer 154 stores the adjusted enhanced image 123 in a memory or storage device.

The system 100 reduces jitter while preserving enhancements (e.g., the added texture) generated by a neural network that are temporally consistent. For example, the high-frequency portion of the enhanced image is adjusted to remove temporally inconsistent enhancements or noise, while leaving the low-frequency portion unchanged to avoid adding unnecessary temporal filtering artifacts in the low-frequency portion.

Figure 2A:
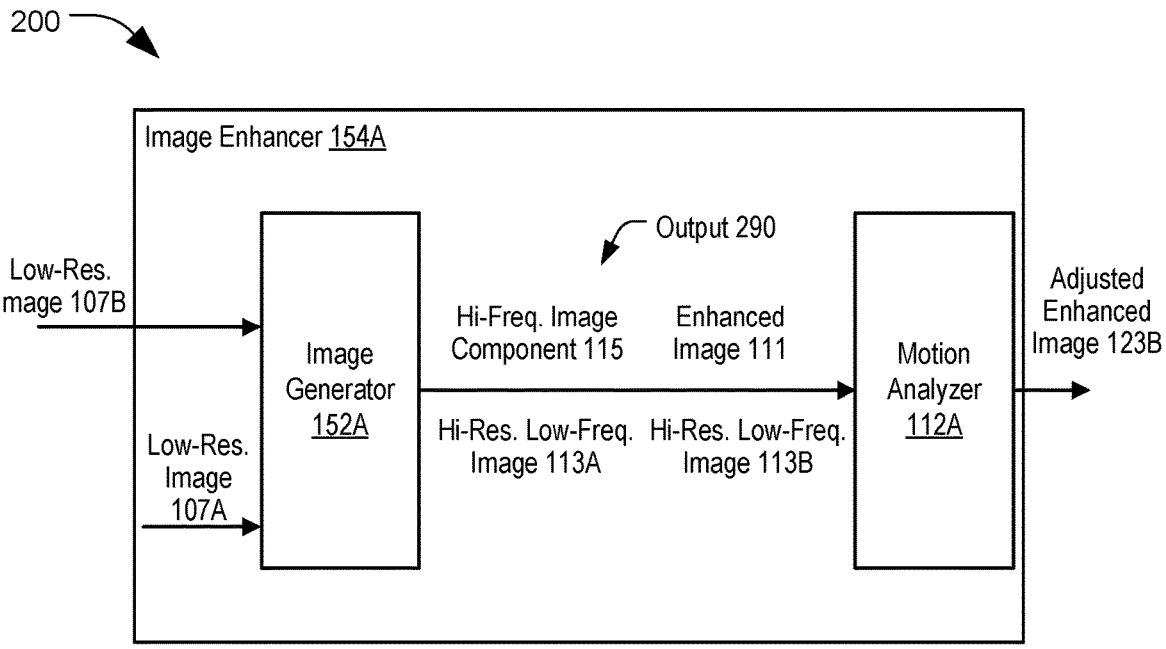
FIG. 2A is a diagram of an illustrative aspect of an image enhancer of the system of FIG. 1, in accordance with some examples of the present disclosure.
Figure 2B:
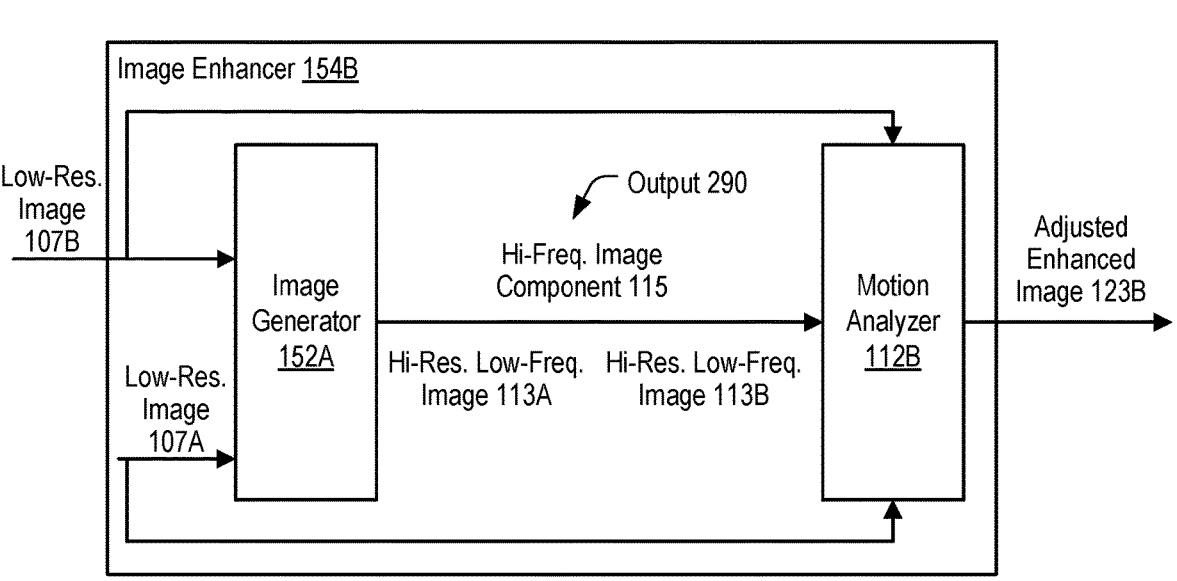
FIG. 2B is a diagram of another illustrative aspect of the image enhancer of the system of FIG. 1, in accordance with some examples of the present disclosure.
Figure 2C:
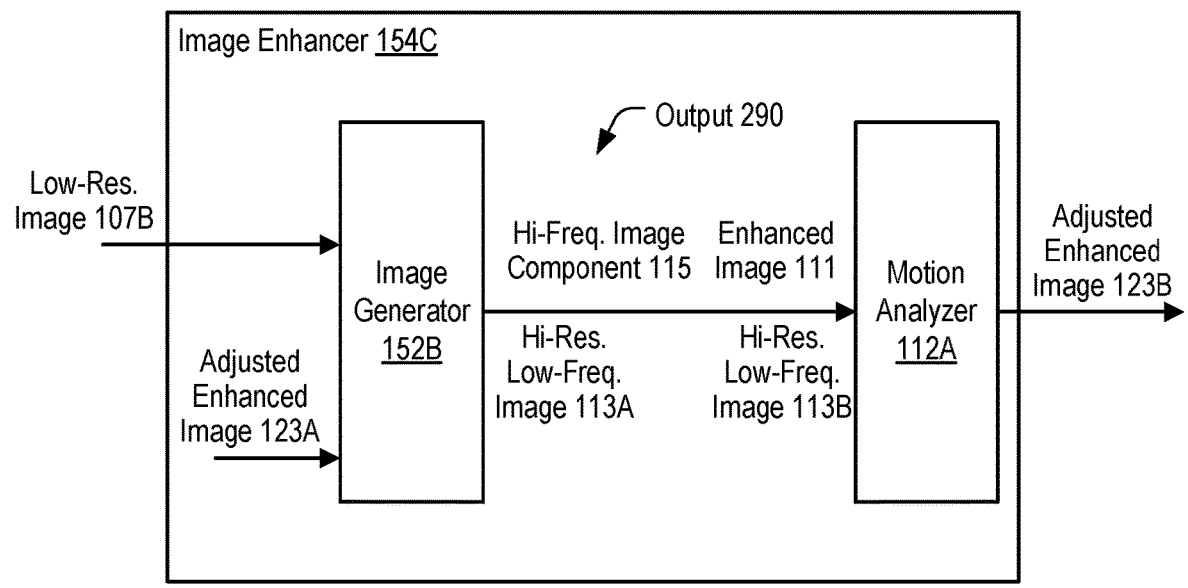
FIG. 2C is a diagram of another illustrative aspect of the image enhancer of the system of FIG. 1, in accordance with some examples of the present disclosure.

FIGS. 2A-2C depict illustrative aspects of various implementations of the motion compensated image enhancer 154 of FIG. 1. In FIG. 2A, a diagram 200 of an image enhancer 154A is shown. In FIG. 2B, a diagram 250 of an image enhancer 154B is shown. In FIG. 2C, a diagram 270 of an image enhancer 154C is shown. Three implementations of the image enhancer 154 are provided as illustrative non-limiting examples.

Referring to FIG. 2A, the image enhancer 154A includes an image generator 152A coupled to a motion analyzer 112A. In a particular aspect, the image generator 152A corresponds to an implementation of the image generator 152 of FIG. 1, and the motion analyzer 112A corresponds to an implementation of the motion analyzer 112 of FIG. 1.

Figure 3A:
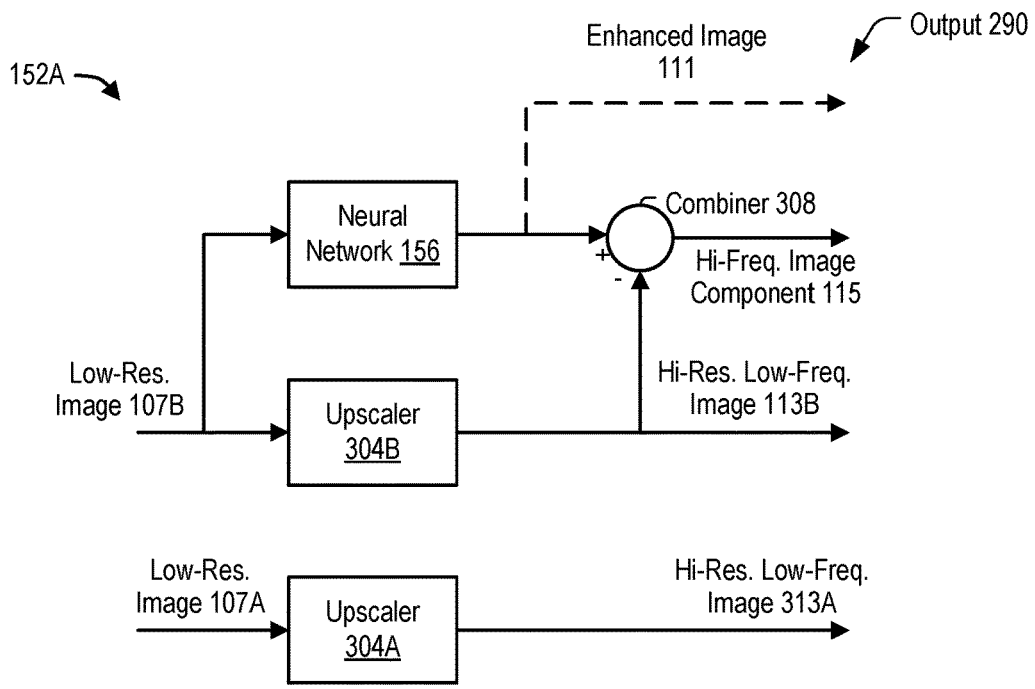
FIG. 3A is a diagram of an illustrative aspect of an image generator of the image enhancer of FIG. 2A and the image enhancer of FIG. 2B, in accordance with some examples of the present disclosure.
Figure 3B:
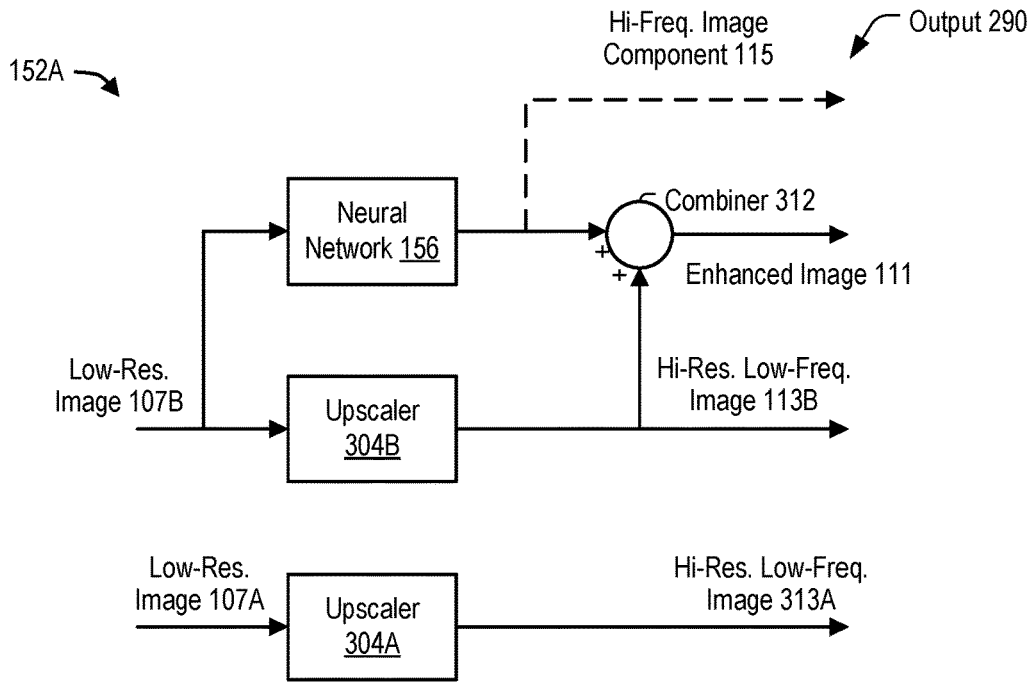
FIG. 3B is a diagram of another illustrative aspect of an image generator of the image enhancer of FIG. 2A and the image enhancer of FIG. 2B, in accordance with some examples of the present disclosure.

The image generator 152A processes a low-resolution image 107B (e.g., a current image frame) and a low-resolution image 107A (e.g., a previous image frame) to generate an output 290 including an enhanced image 111 (e.g., current image frame upscaled and added texture), a high-frequency image component 115 (e.g., the added texture), a high-resolution low-frequency image 113A (e.g., current image frame upscaled), and a high-resolution low-frequency image 113B (e.g., the previous image frame upscaled), as described with reference to FIGS. 3A-3B. In a particular aspect, the low-resolution image 107B corresponds to the low-resolution image 107 of FIG. 1, and the high-resolution low-frequency image 113B corresponds to the high-resolution low-frequency image 113 of FIG. 1.

The motion analyzer 112A generates an adjusted enhanced image 123B (e.g., with the added texture adjusted) based on the output 290, as further described with reference to FIG. 4. For example, the motion analyzer 112A determines motion data (e.g., the motion vectors 117 of FIG. 1) based on performing motion analysis of the high-resolution low-frequency image 113A (e.g., current image frame upscaled) and the high-resolution low-frequency image 113B (e.g., the previous image frame upscaled). The motion analyzer 112A adjusts the high-frequency image component 115 (e.g., the added texture) based at least in part on the motion data to generate the adjusted enhanced image 123B. For example, the motion analyzer 112A generates a predicted high-frequency image component by performing motion compensation on a previous high-frequency image component based on the motion data, and adjusts the high-frequency image component 115 based on the predicted high-frequency image component to generate the adjusted enhanced image 123B, as further described with reference to FIG. 4. In a particular aspect, the adjusted enhanced image 123B corresponds to the adjusted enhanced image 123 of FIG. 1. In a particular aspect, the motion analyzer 112A generates the adjusted enhanced image 123B independently of accessing the low-resolution image 107A and the low-resolution image 107B.

Referring to FIG. 2B, the image enhancer 154B includes the image generator 152A coupled to a motion analyzer 112B. In a particular aspect, the motion analyzer 112B corresponds to an implementation of the motion analyzer 112 of FIG. 1.

The image generator 152A generates the output 290 (e.g., the high-resolution low-frequency image 113A, the high-resolution low-frequency image 113B, the high-frequency image component 115, or a combination thereof). In the example illustrated in FIG. 2B, the enhanced image 111 is not included in the output 290. For example, the motion analyzer 112B generates the adjusted enhanced image 123B independently of accessing the enhanced image 111.

The motion analyzer 112B generates the adjusted enhanced image 123B based on the low-resolution image 107B (e.g., current image frame) and the low-resolution image 107A (e.g., previous image frame), as described with reference to FIG. 5. Motion analysis of the low-resolution images (e.g., the low-resolution image 107A and the low-resolution image 107B) can conserve resources (e.g., time and computation cycles) as compared to motion analysis of high-resolution images (e.g., the high-resolution low-frequency image 113A and the high-resolution low-frequency image 113B) as performed by the motion analyzer 112A.

Referring to FIG. 2C, an image enhancer 154C includes an image generator 152B coupled to the motion analyzer 112A. In a particular aspect, the image enhancer 154C corresponds to an implementation of the image enhancer 154 of FIG. 1.

The image generator 152B generates the output 290 (e.g., the enhanced image 111, the high-frequency image component 115, the high-resolution low-frequency image 113A, the high-resolution low-frequency image 113B, or a combination thereof) based on the low-resolution image 107B (e.g., current image frame) and an adjusted enhanced image 123A (e.g., a previous output image frame), as further described with reference to FIG. 3C. For example, during processing of a previous image frame, the image enhancer 154C processes the low-resolution image 107A (e.g., the previous image frame) to generate the adjusted enhanced image 123A (e.g., a previous output image frame). Subsequently, during processing of a current image frame, the image enhancer 154C processes the low-resolution image 107B (e.g., the current image frame) based on the adjusted enhanced image 123A (e.g., the previous output image frame) to generate the adjusted enhanced image 123B (e.g., current output image frame). For example, the image enhancer 154C generates the high-resolution low-frequency image 113A based on (e.g., the low frequency portion of) the adjusted enhanced image 123A (e.g., the previous output image frame). The motion analyzer 112A performs motion analysis of the high-resolution low-frequency image 113A (e.g., the low frequency portion of the previous output image frame) and the high-resolution low-frequency image 113B (e.g., the current image frame upscaled). Performing the motion analysis on the low frequency portion of the previous output image frame (instead of the upscaled version of the low-resolution image 107A) can improve the reduction in jitter between the adjusted enhanced image 123B (e.g., the current output image frame) and the adjusted enhanced image 123A (e.g., the previous output image frame).

FIGS. 3A and 3B depict illustrative aspects of implementations of the image generator 152A. FIG. 3C depicts illustrative aspects of an implementation of the image generator 152B. In FIGS. 3A-3B, the image generator 152A includes the neural network 156 (e.g., a SRGAN), an upscaler 304A, and an upscaler 304B. In FIG. 3C, the image generator 152B includes the neural network 156 (e.g., a SRGAN), a low pass filter 306A, and a low pass filter 306B. In FIGS. 3A and 3C, the neural network 156 generates the enhanced image 111 (e.g., upscaled and with added texture) based on the low-resolution image 107B (e.g., the current image frame). In FIG. 3B, the neural network 156 generates the high-frequency image component 115 (e.g., the added texture).

Referring to FIG. 3A, the upscaler 304A upscales the low-resolution image 107A (e.g., the previous image frame) to generate a high-resolution low-frequency image 313A (e.g., the previous image frame upscaled). In a particular aspect, the high-resolution low-frequency image 313A corresponds to the high-resolution low-frequency image 113A of FIGS. 2A-2B.

The upscaler 304B upscales the low-resolution image 107B (e.g., the current image frame) to generate the high-resolution low-frequency image 113B (e.g., the current image frame upscaled). The upscaler 304B and the neural network 156 are coupled to a combiner 308. The upscaler 304B provides the high-resolution low-frequency image 113B (e.g., the current image frame upscaled) to the combiner 308. The neural network 156 provides the enhanced image 111 (e.g., the current image frame upscaled and with added texture) to the combiner 308. The combiner 308 generates the high-frequency image component 115 (e.g., the added texture) based on a difference between the enhanced image 111 (e.g., the current image frame upscaled and with added texture) and the high-resolution low-frequency image 113B (e.g., the current image frame upscaled).

The image generator 152A generates the output 290. For example, the output 290 includes the high-resolution low-frequency image 313A (e.g., the previous image frame upscaled) as the high-resolution low-frequency image 113A. The output 290 also includes the high-frequency image component 115 (e.g., the added texture) and the high-resolution low-frequency image 113B (e.g., the current image upscaled). In some implementations, the output 290 includes the enhanced image 111. In other implementations, the enhanced image 111 is not included in the output 290.

Referring to FIG. 3B, the upscaler 304B and the neural network 156 are coupled to a combiner 312. The upscaler 304B provides the high-resolution low-frequency image 113B (e.g., the current image frame upscaled) to the combiner 312. The neural network 156 provides the high-frequency image component 115 (e.g., the added texture) to the combiner 312.

The combiner 312 generates the enhanced image 111 (e.g., the current image frame upscaled and with added texture) by combining the high-frequency image component 115 (e.g., the added texture) and the high-resolution low-frequency image 113B (e.g., the current image frame upscaled).

The image generator 152A generates the output 290. For example, the output 290 includes the high-resolution low-frequency image 313A (e.g., the previous image frame upscaled) as the high-resolution low-frequency image 113A. The output 290 also includes the high-frequency image component 115 (e.g., the added texture) and the high-resolution low-frequency image 113B (e.g., the current image upscaled). In some implementations, the output 290 includes the enhanced image 111. In other implementations, the enhanced image 111 is not included in the output 290.

Figure 3C:
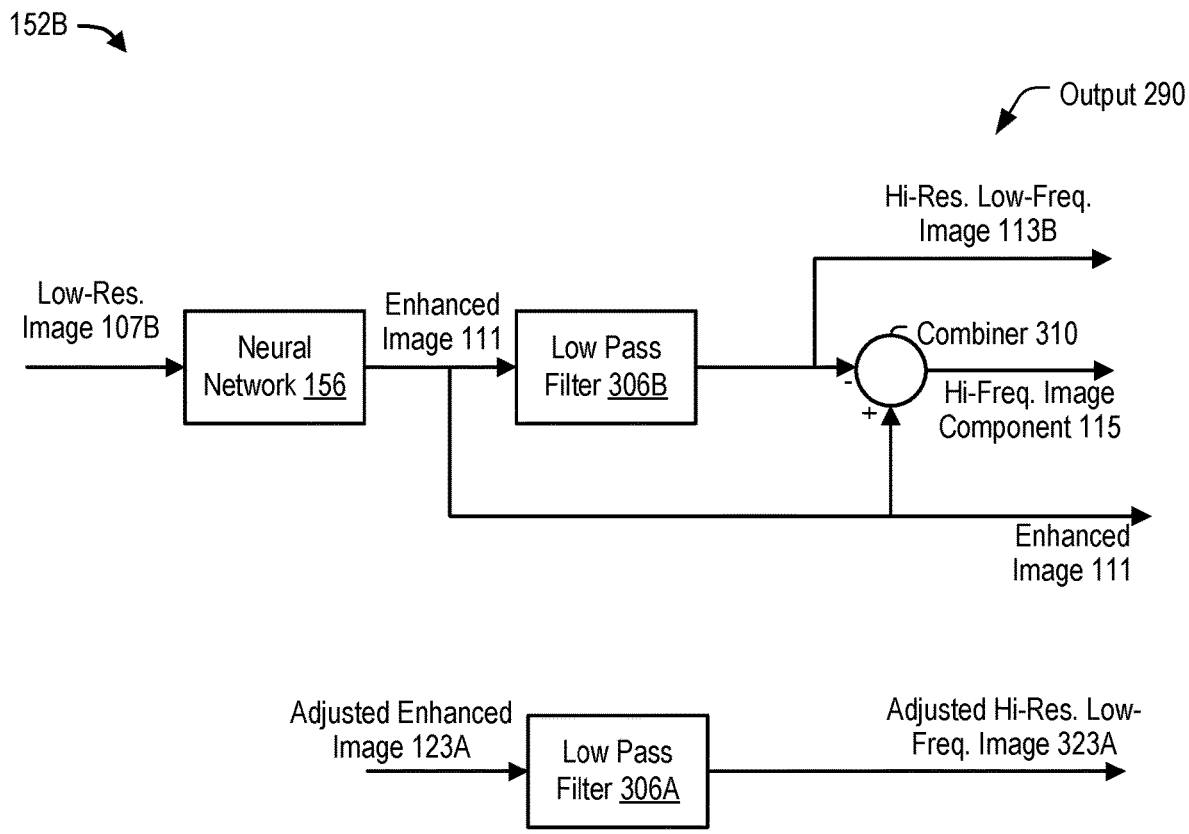
FIG. 3C is a diagram of an illustrative aspect of an image generator of the image enhancer of FIG. 2C, in accordance with some examples of the present disclosure.

Referring to FIG. 3C, the image generator 152B applies the low pass filter 306A to the adjusted enhanced image 123A (e.g., the previous output image frame) to generate an adjusted high-resolution low-frequency image 323A (e.g., a low-frequency portion of the previous output image frame). In a particular aspect, the adjusted high-resolution low-frequency image 323A corresponds to the high-resolution low-frequency image 113A of FIG. 2C.

The image generator 152B applies the low pass filter 306B to the enhanced image 111 (e.g., current image frame upscaled and with added texture) to generate the high-resolution low-frequency image 113B (e.g., the low frequency portion of the enhanced image 111). The low pass filter 306B and the neural network 156 are coupled to a combiner 310. The low pass filter 306B provides the high-resolution low-frequency image 113B (e.g., the low frequency portion of the enhanced image 111) to the combiner 310. The neural network 156 provides the enhanced image 111 to the combiner 310. The combiner 310 generates the high-frequency image component 115 (e.g., the added texture) based on a difference between the enhanced image 111 and the high-resolution low-frequency image 113B (e.g., the low frequency portion of the enhanced image 111).

The image generator 152B generates the output 290. For example, the output 290 includes the high-resolution low-frequency image 323A (e.g., a low-frequency portion of the previous output image frame) as the high-resolution low-frequency image 113A. The output 290 also includes the enhanced image 111, the high-frequency image component 115 (e.g., the added texture), and the high-resolution low-frequency image 113B (e.g., the low frequency portion of the enhanced image 111).

Figure 4:
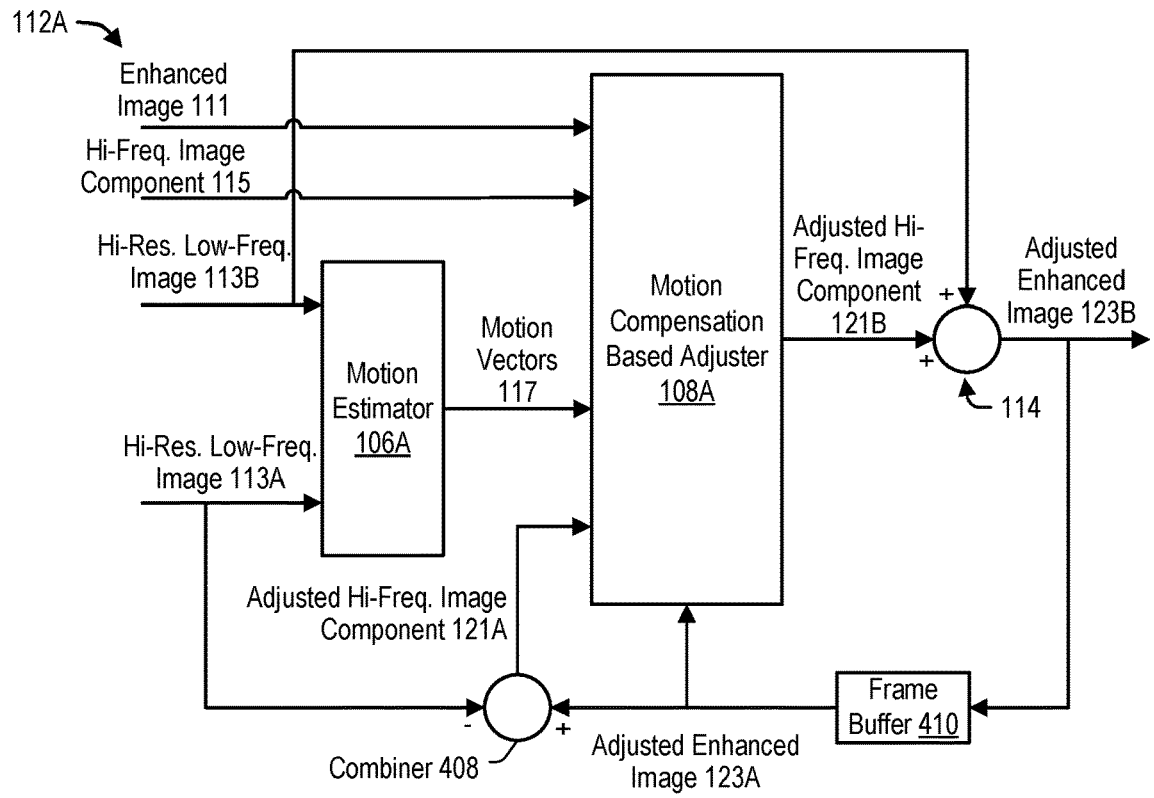
FIG. 4 is a diagram of an illustrative aspect of a motion analyzer of the system of FIG. 1, in accordance with some examples of the present disclosure.
Figure 4:
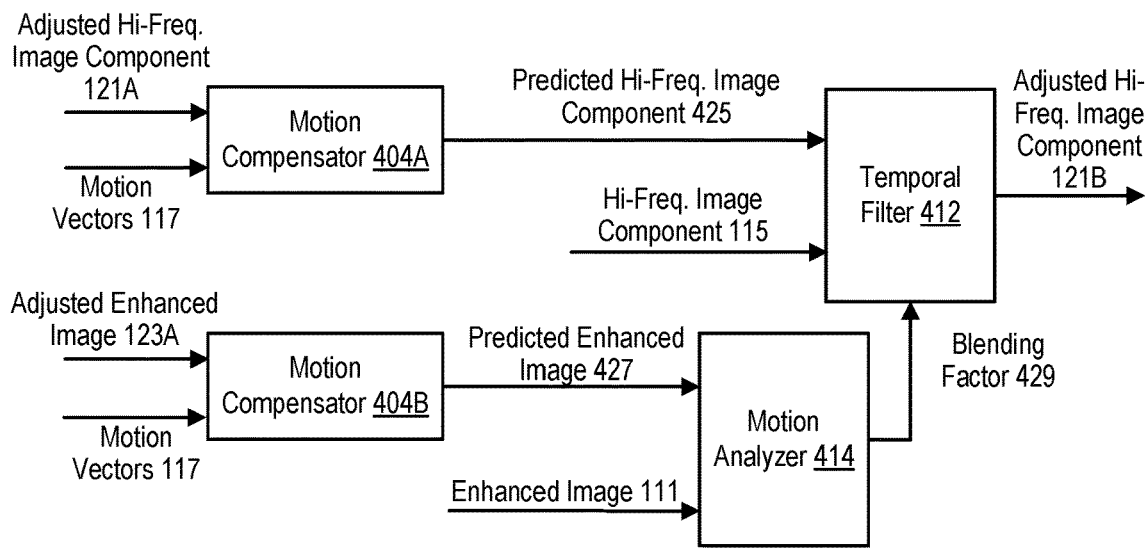
Figure 5:
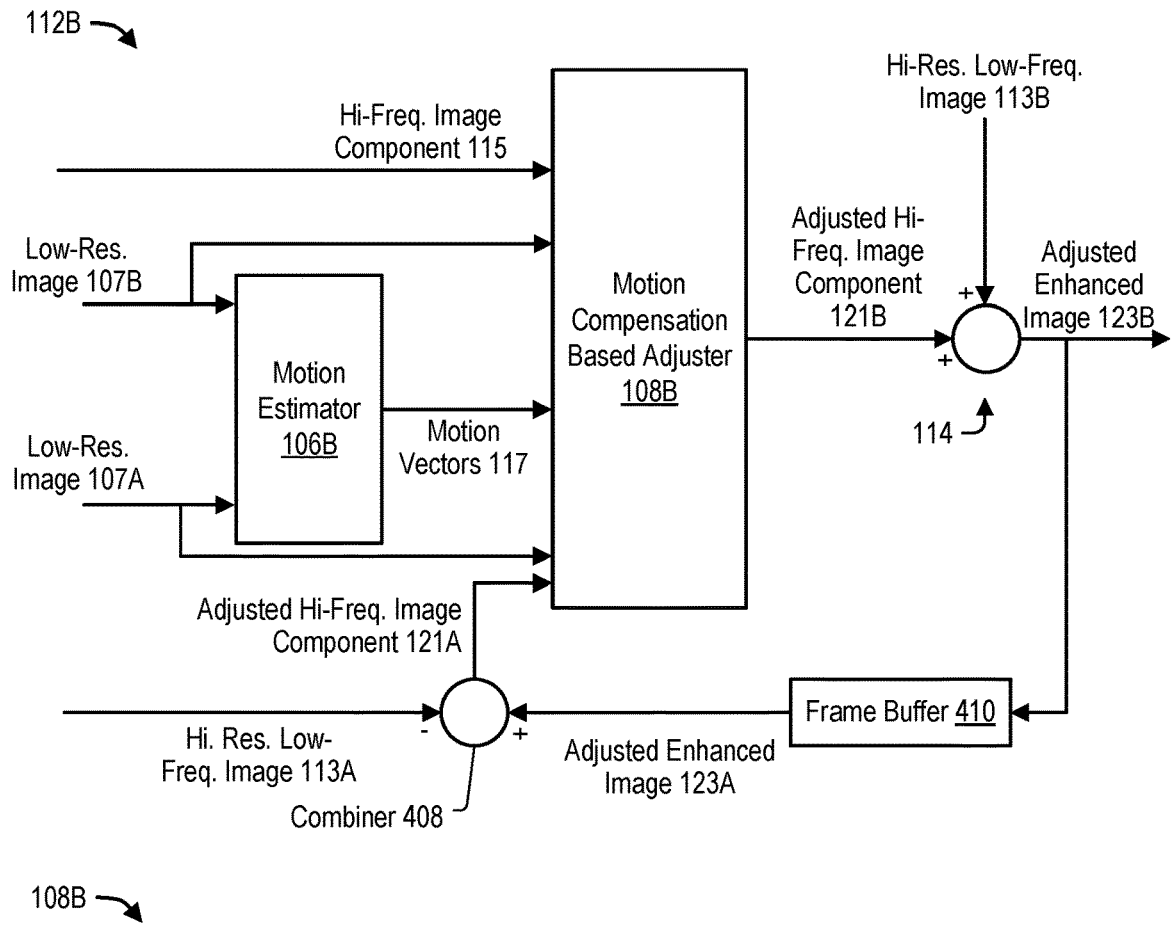
FIG. 5 is a diagram of another illustrative aspect of the motion analyzer of the system of FIG. 1, in accordance with some examples of the present disclosure.
Figure 5:
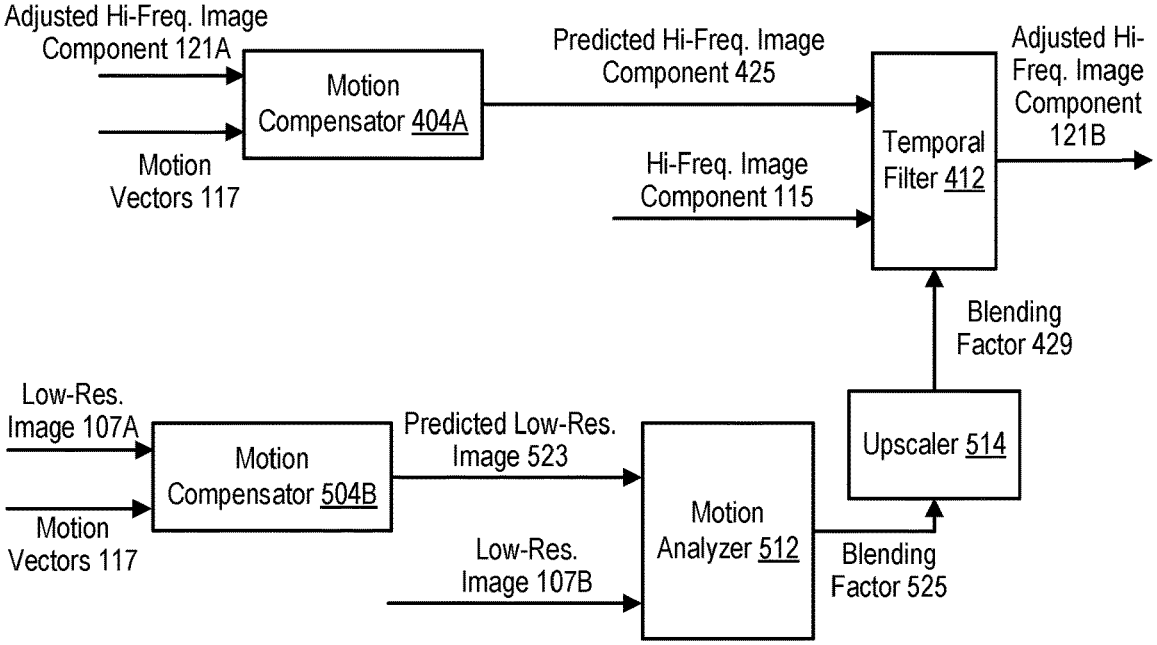

FIGS. 4-5 depict illustrative aspects of implementations of the motion analyzer 112A and the motion analyzer 112B. In FIG. 4, the motion analyzer 112A includes a motion estimator 106A coupled to a motion compensation based adjuster 108A. In FIG. 5, the motion analyzer 112B includes a motion estimator 106B coupled to a motion compensation based adjuster 108B.

Referring to FIG. 4, the motion compensation based adjuster 108A is coupled via the combiner 114 to a frame buffer 410. The frame buffer 410 is coupled to a combiner 408 and the motion compensation based adjuster 108A. The combiner 408 is also coupled to the motion compensation based adjuster 108A.

The motion estimator 106A generates motion vectors 117 by performing motion analysis of the high-resolution low-frequency image 113B (e.g., corresponding to the current image frame) and the high-resolution low-frequency image 113A (e.g., corresponding to the previous image frame). For the motion analyzer 112A included in the image enhancer 154A of FIG. 2A, the high-resolution low-frequency image 113B corresponds to an upscaled version of the low-resolution image 107B (e.g., the current image frame), and the high-resolution low-frequency image 113A corresponds to an upscaled version of the low-resolution image 107A (e.g., the previous image frame), as described with reference to FIGS. 3A-3B. For the motion analyzer 112A included in the image enhancer 154C of FIG. 2C, the high-resolution low-frequency image 113B corresponds to the low frequency portion of the enhanced image 111, and the high-resolution low-frequency image 113A corresponds to the low frequency portion of the adjusted enhanced image 123A, as described with reference to FIG. 3C.

The combiner 408 generates an adjusted high-frequency image component 121A (e.g., adjusted added texture of the previous output image) based on a difference between the adjusted enhanced image 123A (e.g., the previous output image frame) and the high-resolution low-frequency image 113A (e.g., the previous image upscaled or a low frequency portion of the previous output image). In a particular aspect, the combiner 408 retrieves the adjusted enhanced image 123A from the frame buffer 410.

The motion-compensation based adjuster 108A generates an adjusted high-frequency image component 121B (e.g., adjusted added texture) based on the enhanced image 111, the high-frequency image component 115, the adjusted enhanced image 123A, the adjusted high-frequency image component 121A, the motion vectors 117, or a combination thereof, as described herein. The motion compensation based adjuster 108A provides the adjusted high-frequency image component 121B to the combiner 114. The combiner 114 generates the adjusted enhanced image 123B by combining the high-resolution low-frequency image 113B (e.g., the current image upscaled or the low frequency portion of the enhanced image 111) and the adjusted high-frequency image component 121B (e.g., adjusted added texture). For example, the adjusted enhanced image 123B corresponds to the adjusted high-frequency image component 121B (e.g., adjusted added texture) applied to the high-resolution low-frequency image 113B (e.g., the current image upscaled or the low frequency portion of the enhanced image 111). The combiner 114 outputs the adjusted enhanced image 123B, stores the adjusted enhanced image 123B in the frame buffer 410, or both.

The motion compensation based adjuster 108A includes a motion compensator 404A coupled to a temporal filter 412 (e.g., a finite impulse response (FIR) filter or an infinite impulse response (IIR) filter). The motion compensation based adjuster 108A also includes a motion compensator 404B coupled via a motion analyzer 414 to the temporal filter 412.

The motion compensator 404A generates a predicted high-frequency image component 425 by applying the motion vectors 117 to the adjusted high-frequency image component 121A (e.g., adjusted added texture of a previous output image). In a particular aspect, the adjusted high-frequency image component 121A corresponds to a most recently generated previous adjusted enhanced image. To illustrate, the adjusted high-frequency image component 121A is based on a difference between the adjusted enhanced image 123A (e.g., the previous output image frame) and the high-resolution low-frequency image 113A (e.g., the previous image upscaled or a low frequency portion of the previous output image). In a particular aspect, the image enhancer 154 generates the adjusted enhanced image 123A by processing the low-resolution image 107A (e.g., the previous low-resolution image). In a particular aspect, the low-resolution image 107A is an image that is most recently processed by the image enhancer 154 prior to processing the low-resolution image 107B (e.g., the current low-resolution image). In a particular aspect, the adjusted enhanced image 123A is an adjusted enhanced image that is most recently generated by the image enhancer 154 prior to processing the low-resolution image 107B (e.g., the current low-resolution image).

In a particular aspect, the low-resolution image 107A is prior to (e.g., has an earlier timestamp than) the low-resolution image 107B in a playback sequence. In another aspect, the low-resolution image 107A is subsequent to (e.g., has a later timestamp than) the low-resolution image 107B in a playback sequence. The motion compensator 404A provides the predicted high-frequency image component 425 to the temporal filter 412.

The motion compensator 404B generates a predicted enhanced image 427 by applying the motion vectors 117 to the adjusted enhanced image 123A (e.g., the previous output image). The motion analyzer 414 generates a blending factor 429 based on a comparison of the predicted enhanced image 427 and the enhanced image 111. For example, the motion analyzer 414 determines a matching metric for a particular pixel based on a comparison of the particular pixel and one or more neighboring pixels of the predicted enhanced image 427 with corresponding pixels of the enhanced image 111. To illustrate, the motion analyzer 414 generates the matching metric for the particular pixel based on a sum of absolute differences (SAD) between pixel values of a particular pixel window (e.g., a 5 pixel by 5 pixel window centered around the particular pixel at first pixel coordinates) of the predicted enhanced image 427 and pixel values of a corresponding pixel window (e.g., a pixel window centered around a pixel at the first pixel coordinates) of the enhanced image 111. The motion analyzer 414 determines the blending factor 429 based on the matching metrics for the pixels of the predicted enhanced image 427 and the enhanced image 111. In a particular implementation, the motion detector 414, in response to determining that the matching metrics (e.g., an average SAD value) are greater than a first threshold, sets the blending factor 429 to a first value (e.g., a minimum value or 0). Alternatively, the motion detector 414, in response to determining that the matching metrics (e.g., the average SAD value) are less than a second threshold, sets the blending factor 429 to a second value (e.g., a maximum value or 1). The motion detector 414, in response to determining that the matching metrics (e.g., the average SAD value) are less than or equal to the first threshold and greater than equal to the second threshold, sets the blending factor 429 to a value between the first value (e.g., the minimum value or 0) and the second value (e.g., the maximum value or 1). For example, the motion detector 414 determines the blending factor 429 by applying a linear function to the matching metrics (e.g., the average SAD value). In a particular aspect, the motion detector 414 uses a filter (e.g., a Gaussian filter) to smoothly transition between the first value (e.g., the minimum value or 0) and the second value (e.g., the maximum value or 1).

The blending factor 429 indicates a difference between the predicted enhanced image 427 and the enhanced image 111. In a particular aspect, the blending factor 429 corresponds to accuracy of the motion vectors 117. In some implementations, a higher value of the blending factor 429 indicates a closer match between the predicted enhanced image 427 and the enhanced image 111 and a higher accuracy of the motion vectors 117. Alternatively, a lower value of the blending factor 429 corresponds to a greater difference between the predicted enhanced image 427 and the enhanced image 111 and a lower accuracy of the motion vectors 117.

The motion analyzer 414 provides the blending factor 429 to the temporal filter 412. In some implementations, the temporal filter 412 performs IIR filtering based on the predicted high-frequency image component 425 and the high-frequency image component 115. For example, the temporal filter 412 combines, based on the blending factor 429, the predicted high-frequency image component 425 (e.g., the predicted adjusted added texture) and the high-frequency image component 115 (e.g., the added texture) to generate the adjusted high-frequency image component 121B (e.g., the adjusted added texture). To illustrate, the temporal filter 412 determines a first weight and a second weight based on the blending factor 429. For example, the first weight is the blending factor 429 and the temporal filter 412 determines the second weight by subtracting the first weight from a particular number (e.g., second weight=1−first weight). The temporal filter 412 applies the first weight (e.g., the blending factor 429) to the predicted high-frequency image component 425 to generate a first weighted image component, and applies the second weight (e.g., 1−the blending factor 429) to the high-frequency image component 115 to generate a second weighted image component. The temporal filter 412 combines the first weighted image component and the second weighted image component to generate the adjusted high-frequency image component 121B.

In some examples, the closer match that the enhanced image 111 is to the predicted enhanced image 427 (e.g., as indicated by a higher value of the blending factor 429) corresponding to a greater accuracy of the motion vectors 117, the more weight is given to the predicted high-frequency image component 425. Alternatively, the greater the difference between the enhanced image 111 and the predicted enhanced image 427 (e.g., as indicated by a lower value of the blending factor 429) corresponding to a lower accuracy of the motion vectors 117, the more weight is given to the high-frequency image component 115 (e.g., the texture added by the neural network 156).

The adjusted enhanced image 123B thus includes a high frequency component (e.g., the adjusted high-frequency image component 121B) that is adjusted based on motion detected in the enhanced image 111 relative to the predicted enhanced image 427. The adjusted enhanced image 123B includes more of the texture added by the neural network 156 in cases indicating less accuracy of the motion vectors 117 (e.g., where more motion is detected in the enhanced image 111 relative to the predicted enhanced image 427). Alternatively, the adjusted enhanced image 123B includes more of the predicted high-frequency image component 425 in cases indicating greater accuracy of the motion vectors 117 (e.g., where less motion is detected in the enhanced image 111 relative to the predicted enhanced image 427).

Generating the adjusted high-frequency image component 121B based on a single blending factor 429 that is generated based on a frame-wise comparison (e.g., of the predicted enhanced image 427 and the enhanced image 111) is provided as an illustrative example. In other examples, the motion analyzer 414 determines an accuracy of the motion vectors 117 (e.g., as indicated by a plurality of blending factors) based on a comparison of portions of the predicted enhanced image 427 and corresponding portions of the enhanced image 111. For example, the motion analyzer 414 determines a first blending factor based on a comparison (e.g., a first matching metric) of a first portion of the predicted enhanced image 427 and a corresponding first portion of the enhanced image 111, a second blending factor based on a comparison (e.g., a second matching metric) of a second portion of the predicted enhanced image 427 and a corresponding second portion of the enhanced image 111, and so on. The temporal filter 412 applies temporal filtering to generate a first portion of the adjusted high-frequency image component 121B based on the first blending factor, a first portion of the predicted high-frequency image component 425, and a first portion of the high-frequency image component 115 (e.g., the added texture). Similarly, the temporal filter 412 applies temporal filtering to generate a second portion of the adjusted high-frequency image component 121B based on the second blending factor, a second portion of the predicted high-frequency image component 425, and a second portion of the high-frequency image component 115 (e.g., the added texture). Various portions of the adjusted high-frequency image component 121B may thus be temporally filtered based on different blending factors corresponding to accuracy of local motion vectors.

Determining the blending factor 429 (or the plurality of blending factors) based on a comparison of the predicted enhanced image 427 and the enhanced image 111 (or a comparison of portions thereof) is provided as an illustrative example. In some examples, the motion compensator 404B generates a predicted high-resolution low-frequency image by applying the motion vectors 117 to the high-resolution low-frequency image 113A and the motion analyzer 414 determines the blending factor 429 (or a plurality of blending factors) based on the predicted high-resolution low-frequency image and the high-resolution low-frequency image 113B. For example, the motion analyzer 414 determines the blending factor 429 based on a comparison of the predicted high-resolution low-frequency image and the high-resolution low-frequency image 113B. As another example, the motion analyzer 414 determines a plurality of blending factors based on a comparison of portions of the predicted high-resolution low-frequency image and corresponding portions of the high-resolution low-frequency image 113B. The temporal filter 412 generates the adjusted high-frequency image component 121B based on the blending factor 429 (or the plurality of blending factors).

Referring to FIG. 5, illustrative aspects of the motion analyzer 112B included in the image enhancer 154B of FIG. 2B is shown. The motion estimator 106B is coupled via the combiner 114 to the frame buffer 410. The frame buffer 410 is coupled via the combiner 408 to a motion compensation based adjuster 108B.

The motion estimator 106B generates motion vectors 117 based on a comparison of the low-resolution image 107B (current image frame) and the low-resolution image 107A (previous image frame). Because the low-resolution images 107 have fewer pixels than the high-resolution images 113, generating the motion vectors 117 based on motion analysis of the low-resolution images 107 can conserve resources (e.g., time, computing cycles, memory usage, etc.) as compared to generating the motion vectors 117 based on motion analysis of the high-resolution images 113 (as described with reference to the motion estimator 106A of FIG. 4).

The motion-compensation based adjuster 108B is configured to generate the adjusted high-frequency image component 121B (e.g., added texture adjusted based on motion compensation) based on the high-frequency image component 115, the adjusted high-frequency image component 121A, the motion vectors 117, the low-resolution image 107A, the low-resolution image 107B, or a combination thereof, as described herein.

The motion compensation based adjuster 108B provides the adjusted high-frequency image component 121B to the combiner 114. The combiner 114 generates the adjusted enhanced image 123B by combining the high-resolution low-frequency image 113B (e.g., the current image upscaled) and the adjusted high-frequency image component 121B (e.g., adjusted added texture). For example, the adjusted enhanced image 123B corresponds to the adjusted high-frequency image component 121B (e.g., adjusted added texture) applied to the high-resolution low-frequency image 113B (e.g., the current image upscaled). The combiner 114 outputs the adjusted enhanced image 123B, stores the adjusted enhanced image 123B in the frame buffer 410, or both.

The motion compensation based adjuster 108B includes the motion compensator 404A coupled to the temporal filter 412 (e.g., an FIR filter or an IIR filter). The motion compensation based adjuster 108B also includes a motion compensator 504B coupled via a motion analyzer 512 and an upscaler 514 to the temporal filter 412.

The motion compensator 404A generates the predicted high-frequency image component 425 by applying the motion vectors 117 to the adjusted high-frequency image component 121A (e.g., adjusted added texture of a previous output image). The motion compensator 404A provides the predicted high-frequency image component 425 to the temporal filter 412.

The motion compensator 504B generates a predicted low-resolution image 523 by applying the motion vectors 117 to the low-resolution image 107A (e.g., the previous image frame). Because the low-resolution image 107A has fewer pixels than the adjusted enhanced image 123A, applying the motion vectors 117 to the low-resolution image 107A may use fewer resources (e.g., time, computing cycles, memory, etc.) as compared to applying the motion vectors 117 to the adjusted enhanced image 123A (as described with reference to FIG. 4).

The motion analyzer 512 generates a blending factor 525 based on a comparison of the predicted low-resolution image 523 and the low-resolution image 107B. For example, the motion analyzer 512 determines a matching metric for a particular pixel based on a comparison of the particular pixel and one or more neighboring pixels of the predicted low-resolution image 523 with corresponding pixels of the low-resolution image 107B. To illustrate, the motion analyzer 512 generates the matching metric for the particular pixel based on a sum of absolute differences between pixel values of a particular pixel window (e.g., a 5 pixel by 5 pixel window centered around the particular pixel at first pixel coordinates) of the predicted low-resolution image 523 and pixel values of a corresponding pixel window (e.g., a pixel window centered around a pixel at the first pixel coordinates) of the low-resolution image 107B. The motion analyzer 512 determines the blending factor 525 based on the matching metrics for the pixels of the predicted low-resolution image 523 and the low-resolution image 107B.

The blending factor 525 indicates a difference between the predicted low-resolution image 523 and the low-resolution image 107B. In a particular aspect, the blending factor 429 corresponds to accuracy of the motion vectors 117. In some implementations, a higher value of the blending factor 525 indicates a closer match between the predicted low-resolution image 523 and the low-resolution image 107B and indicates a higher accuracy of the motion vectors 117. Alternatively, a lower value of the blending factor 429 corresponds to a greater difference between the predicted enhanced image 427 and the enhanced image 111 and indicates a lower accuracy of the motion vectors 117.

The upscaler 514 upscales the blending factor 525 to generate the blending factor 429. For example, the upscaler 514 can operate in a similar manner as the upscaler 304B of FIGS. 3A-3B that upscales the low-resolution image 107B by a particular upscaling factor to generate the high-resolution low-frequency image 113B. The upscaler 514 upscales the blending factor 525 based on the particular upscaling factor to the generate the blending factor 429.

The upscaler 514 provides the blending factor 429 to the temporal filter 412. The temporal filter 412 combines, based on the blending factor 429, the predicted high-frequency image component 425 (e.g., the predicted adjusted added texture) and the high-frequency image component 115 to generate the adjusted high-frequency image component 121B. For example, the temporal filter 412 of FIG. 5 performs similar operations as described with reference to the temporal filter 412 of FIG. 4 to generate the adjusted high-frequency image component 121B based on the blending factor 429, with the temporal filter 412 of FIG. 5 receiving the blending factor 429 from the upscaler 514 whereas the temporal filter 412 of FIG. 4 receives the blending factor 429 from the motion analyzer 414 of FIG. 4.

In some examples, the closer match that the low-resolution image 107B is to the predicted low-resolution image 523 (e.g., as indicated by a higher value of the blending factor 429) corresponding to a greater accuracy of the motion vectors 117, the more weight is given to the predicted low-resolution image 523. Alternatively, the greater the difference between the low-resolution image 107B and the predicted low-resolution image 523 (e.g., as indicated by a lower value of the blending factor 429) corresponding to a lower accuracy of the motion vectors 117, the more weight is given to the high-frequency image component 115 (e.g., the texture added by the neural network 156).

The adjusted enhanced image 123B thus includes a high frequency component (e.g., the adjusted high-frequency image component 121B) that is adjusted based on motion detected in the low-resolution image 107B relative to the predicted low-resolution image 523. The adjusted enhanced image 123B includes more of the texture added by the neural network 156 in cases indicating less accuracy of the motion vectors 117 (e.g., where more motion is detected in the low-resolution image 107B relative to the predicted low-resolution image 523). Alternatively, the adjusted enhanced image 123B includes more of the texture added by the predicted high-frequency image component 425 (e.g., the predicted adjusted added texture) in cases indicating greater accuracy of the motion vectors 117 (e.g., where less motion is detected in the low-resolution image 107B relative to the predicted low-resolution image 523).

Generating the adjusted high-frequency image component 121B based on a single blending factor 429 that is generated based on a frame-wise comparison (e.g., of the predicted low-resolution image 523 and the low-resolution image 107B) is provided as an illustrative example. In other examples, the motion analyzer 512 determines an accuracy of the motion vectors 117 (e.g., as indicated by a plurality of blending factors) based on a comparison of portions of the predicted low-resolution image 523 and corresponding portions of the low-resolution image 107B. For example, the motion analyzer 512 determines a first blending factor based on a comparison (e.g., a first matching metric) of a first portion of the predicted low-resolution image 523 and a corresponding first portion of the low-resolution image 107B, a second blending factor based on a comparison (e.g., a second matching metric) of a second portion of the predicted low-resolution image 523 and a corresponding second portion of the low-resolution image 107B, and so on. The upscaler 514 determines a first upscaled blending factor by upscaling the first blending factor, a second upscaled blending factor by upscaling the second blending factor, and so on.

The temporal filter 412 applies temporal filtering to generate a first portion of the adjusted high-frequency image component 121B based on the first upscaled blending factor, a first portion of the predicted high-frequency image component 425, and a first portion of the high-frequency image component 115 (e.g., the added texture). Similarly, the temporal filter 412 applies temporal filtering to generate a second portion of the adjusted high-frequency image component 121B based on the second upscaled blending factor, a second portion of the predicted high-frequency image component 425, and a second portion of the high-frequency image component 115 (e.g., the added texture). Various portions of the adjusted high-frequency image component 121B may thus be temporally filtered based on different blending factors corresponding to accuracy of local motion vectors.

Figure 6:
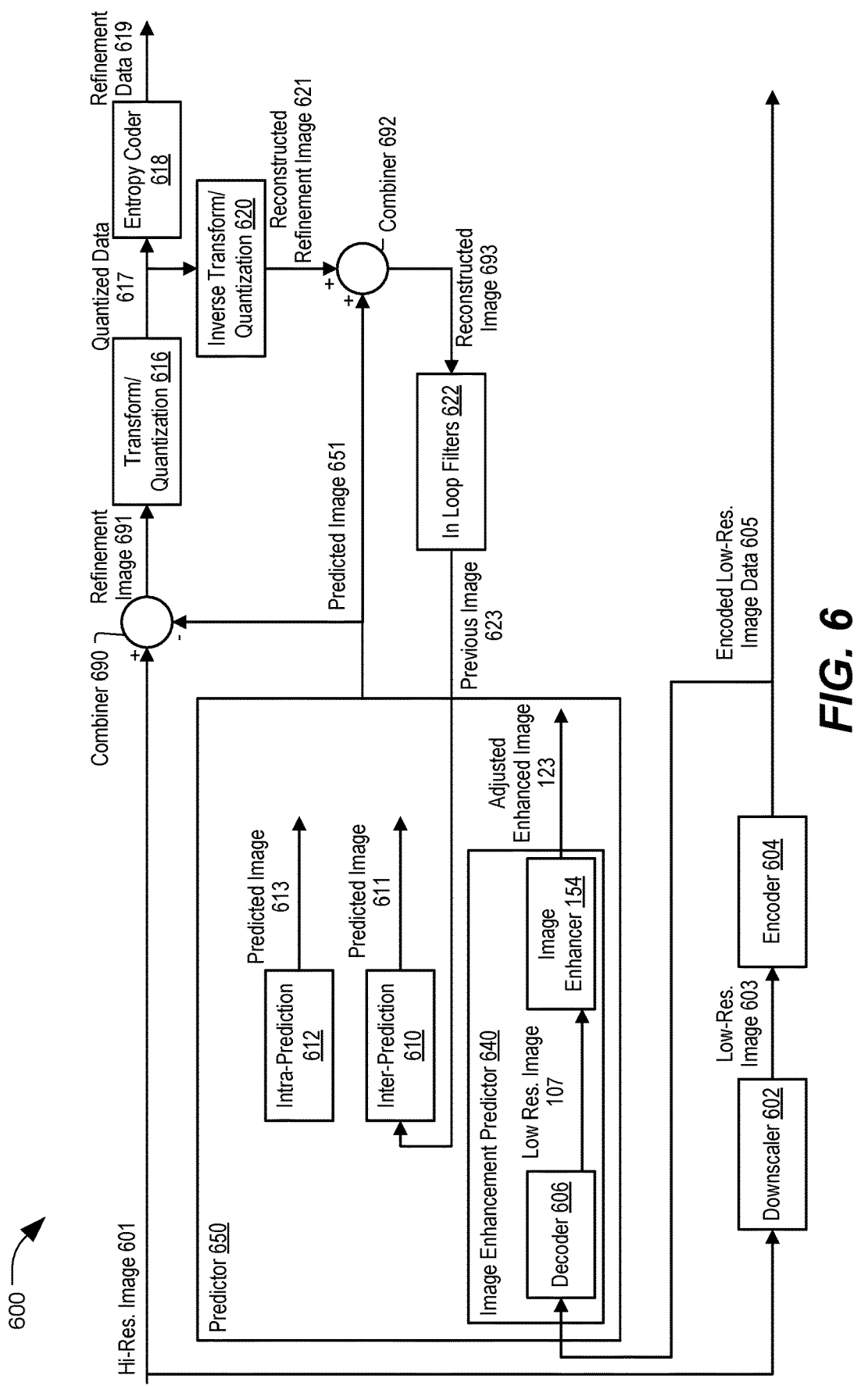
FIG. 6 is a diagram of an illustrative aspect of an encoder operable to perform motion compensation for neural network enhanced images, in accordance with some examples of the present disclosure.

Referring to FIG. 6, an illustrative aspect of a scalable video encoder 600 is shown. In a particular aspect, the scalable video encoder 600 is integrated in the one or more processors 190 of FIG. 1.

In some implementations, the scalable video encoder 600 processes a high-resolution image 601 to generate encoded low-resolution image data 605 (e.g., image encoding data) and refinement data 619 for transmission as the output data 171 to the device 160 of FIG. 1. In a particular aspect, the high-resolution image 601 is based on the camera input 127 received from the camera 126. In an example, the scalable video encoder 600 encodes one or more high-resolution images 601 of the camera input 127 to stream to the device 160.

The scalable video encoder 600 includes a downscaler 602 coupled to an encoder 604. In a particular aspect, the downscaler 602 applies downsampling to the high-resolution image 601 to generate a low-resolution image 603. The low-resolution image 603 has fewer pixels than the high-resolution image 601. The encoder 604 encodes the low-resolution image 603 to generate encoded low-resolution image data 605.

The scalable video encoder 600 also generates the refinement data 619. For example, the refinement data 619 is configured for use by a decoder to reduce a difference between a reconstructed image (e.g., a decoded image) generated from the encoded low-resolution image data 605 and the high-resolution image 601. To illustrate, the refinement data 619 is generated based on a comparison of (e.g., a difference between) the high-resolution image 601 and a predicted image 651 that is generated based on local decoding of the encoded low-resolution image data 605.

The scalable video encoder 600 includes a predictor 650 configured to generate the predicted image 651 based on the encoded low-resolution image data 605. In a particular aspect, the predictor 650 includes an image enhancement predictor 640. The image enhancement predictor 640 includes a decoder 606 (e.g., a local decoder) coupled to an image enhancer 154. In a particular aspect, the image enhancer 154 corresponds to the image enhancer 154A of FIG. 2A, the image enhancer 154B of FIG. 2B, or the image enhancer 154C of FIG. 2C.

The decoder 606 decodes the encoded low-resolution image data 605 to generate a low-resolution image 107 (e.g., a decoded low-resolution image). The image enhancer 154 processes the low-resolution image 107 to generate an adjusted enhanced image 123, as described with reference to FIG. 1. In some examples, the predictor 650 is also configured to perform inter-prediction 610 to generate a predicted image 611, perform intra-prediction 612 to generate a predicted image 613, or both.

The predictor 650 generates the predicted image 651 based on the adjusted enhanced image 123, the predicted image 611, the predicted image 613, or a combination thereof. For example, the predictor 650 generates the predicted image 613 by performing the intra-prediction 612 based on the adjusted enhanced image 123. As another example, the predictor 650 generates the predicted image 611 by performing the inter-prediction 710 based on the adjusted enhanced image 123 and a previous image 623.

The predictor 650 is coupled to a combiner 690 and to a combiner 692. The predictor 650 provides the predicted image 651 to each of the combiner 690 and the combiner 692. The predicted image 651 corresponds to a reconstructed image predicted to be generated at a decoder (e.g., of the device 160) based on the encoded low-resolution image data 605. The combiner 690 generates a refinement image 691 based on a difference between the high-resolution image 601 and the predicted image 651. The scalable video encoder 600 is configured to perform transform/quantization 616 on the refinement image 691 to generate quantized data 617. For example, the scalable video encoder 600 applies a transform to the refinement image 691 to generate a transformed refinement image and applies quantization to the transformed refinement image to generate the quantized data 617. The scalable video encoder 600 is configured to provide the quantized data 617 to an entropy coder 618 to generate the refinement data 619. For example, the entropy coder 618 applies entropy coding to the quantized data 617 to generate the refinement data 619. In some implementations, the scalable video encoder 600 initiates transmission of the encoded low-resolution image data 605 and the refinement data 619 as the output data 171 to the device 160.

The scalable video encoder 600 performs inverse transform/quantization 620 on the quantized data 617 to generate a reconstructed refinement image 621. In a particular aspect, the reconstructed refinement image 621 corresponds to an estimate of a reconstructed refinement image to be generated at a decoder (e.g., of the device 160) based on the refinement data 619. The combiner 692 combines the predicted image 651 and the reconstructed refinement image 621 to generate a reconstructed image 693. In a particular aspect, the reconstructed image 693 corresponds to an estimate of a reconstructed image to be generated at a decoder (e.g., of the device 160) based on the encoded low-resolution image data 605 and the refinement data 619. In a particular aspect, the scalable video encoder 600 applies in loop filters 622 to the reconstructed image 693 to generate a filtered image and provides the filtered image as a previous image 623 to be used for the inter-prediction 610 of a subsequent image frame.

The image enhancer 154 at the scalable video encoder 600 thus enables generation of a predicted image 651 that corresponds to an estimate of a reconstructed image to be generated at a decoder (e.g., of the device 160) that includes a copy of the image enhancer 154.

Figure 7:
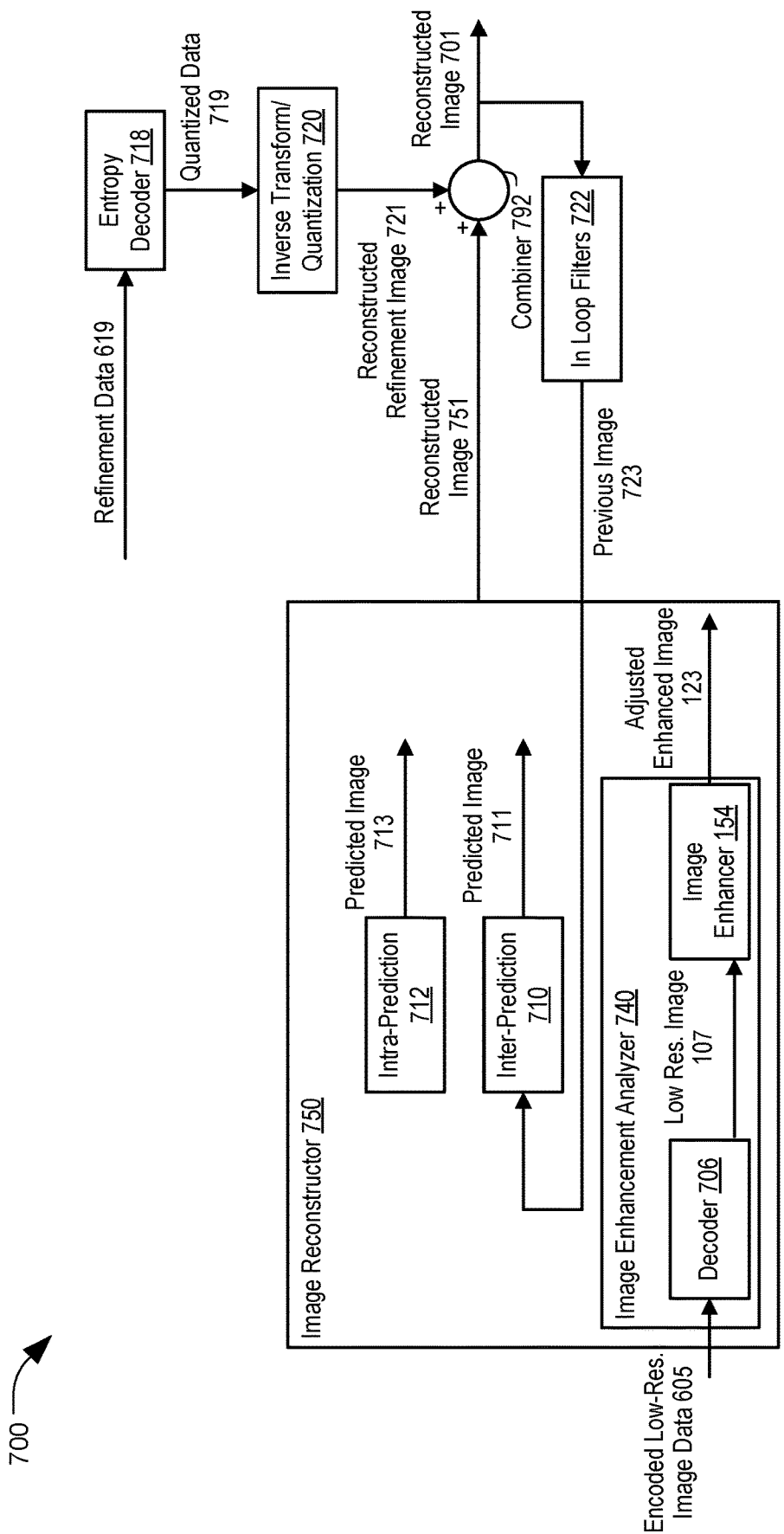
FIG. 7 is a diagram of an illustrative aspect of a decoder operable to perform motion compensation for neural network enhanced images, in accordance with some examples of the present disclosure.

Referring to FIG. 7, an illustrative aspect of a scalable video decoder 700 is shown. In a particular aspect, the scalable video decoder 700 is integrated in the device 160 of FIG. 1. In a particular aspect, the device 102 includes copies of one or more components described with reference to the device 160. In a particular aspect, the device 160 includes copies of one or more components described with reference to the device 102. In an illustrative example, each of the device 102 and the device 160 includes a copy of the scalable video encoder 600 and a copy of the scalable video decoder 700.

The scalable video decoder 700 receives the encoded low-resolution image data 605 and the refinement data 619. For example, the scalable video decoder 700 receives the encoded low-resolution image data 605 and the refinement data 619 as the output data 171 from the device 102 of FIG. 1.

The scalable video decoder 700 includes an image reconstructor 750 configured to generate a reconstructed image 751 based on the encoded low-resolution image data 605. In a particular aspect, the image reconstructor 750 includes an image enhancement analyzer 740. The image enhancement analyzer 740 includes a decoder 706 coupled to an image enhancer 154. In a particular aspect, the image enhancer 154 corresponds to the image enhancer 154A of FIG. 2A, the image enhancer 154B of FIG. 2B, or the image enhancer 154C of FIG. 2C.

The decoder 706 decodes the encoded low-resolution image data 605 to generate a low-resolution image 107 (e.g., a reconstructed low-resolution image). The image enhancer 154 processes the low-resolution image 107 to generate an adjusted enhanced image 123, as described with reference to FIG. 1. In some examples, the image reconstructor 750 is also configured to perform inter-prediction 710 to generate a predicted image 711, perform intra-prediction 712 to generate a predicted image 713, or both.

The image reconstructor 750 generates the reconstructed image 751 based on the adjusted enhanced image 123, the predicted image 711, the predicted image 713, or a combination thereof. For example, the image reconstructor 750 generates the predicted image 713 by performing the intra-prediction 712 based on the adjusted enhanced image 123. As another examples, the image reconstructor 750 generates the predicted image 711 by performing the inter-prediction 710 based on the adjusted enhanced image 123 and a previous image 723.

The image reconstructor 750 provides the reconstructed image 751 to a combiner 792. The scalable video decoder 700 also includes an entropy decoder 718 that decodes the refinement data 619 to generate quantized data 719. The scalable video decoder 700 performs inverse transform/quantization 720 on the quantized data 719 to generate a reconstructed refinement image 721.

The combiner 792 combines the reconstructed image 751 and the reconstructed refinement image 721 to generate a reconstructed image 701. In a particular aspect, the scalable video decoder 700 outputs the reconstructed image 701 to a memory, a display device, a network device, or a combination thereof. In a particular aspect, the scalable video decoder 700 applies in loop filters 722 to the reconstructed image 701 to generate a filtered image and provides the filtered image as a previous image 723 to be used for the inter-prediction 710 of a subsequent image frame.

The image enhancer 154 at the scalable video encoder 700 thus enables generating an adjusted enhanced image 123 by applying motion compensation on high frequency portions of an enhanced image that is based on the low-resolution image 107, and using the adjusted enhanced image 123 to generate the reconstructed image 701. Applying the motion compensation reduces visible flicker between reconstructed images 701 output by the scalable video decoder 700.

Figure 8:
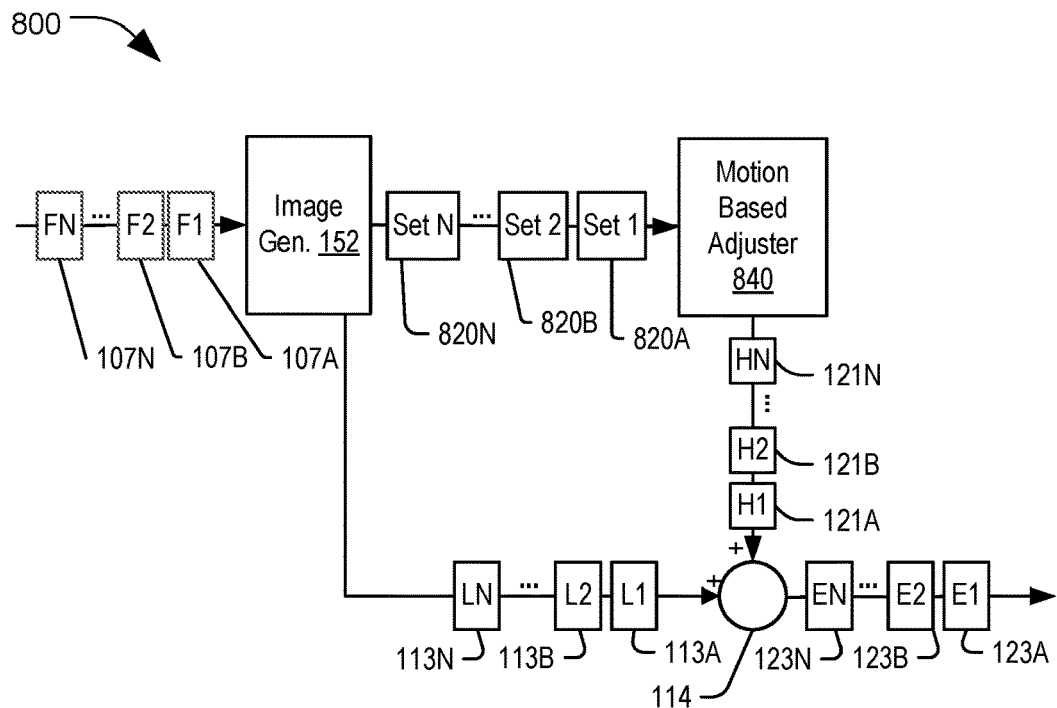
FIG. 8 is a diagram of an illustrative aspect of operation of components of the system of FIG. 1, in accordance with some examples of the present disclosure.

Referring to FIG. 8, a diagram 800 of an illustrative aspect of operation of components of the system of FIG. 1 is shown. The image generator 152 is configured to receive a sequence of low-resolution images 107, such as a sequence of successively captured image frames of a video, illustrated as a first frame (F1) 107A, a second frame (F2) 107B, and one or more additional frames including an Nth frame (FN) 107N (where N is an integer greater than two).

The image generator 152 is configured to output a sequence of high-resolution low-frequency images 113 including a first high-resolution low-frequency image (L1) 113A, a second high-resolution low-frequency image (L2) 113B, and one or more additional high-resolution low-frequency images including an Nth high-resolution low-frequency image (LN) 113N. The image generator 152 is configured to output a sequence of image data sets 820 including a first image data set (Set 1) 820A, a second image data set (Set 2) 820B, and one or more additional image data sets including an Nth image data set (Set N) 820N.

In a particular aspect, each image data set 820 includes an enhanced image 111, a high-resolution low-frequency image 113, a high-frequency image component 115, or a combination thereof. In an example, the image generator 152 processes a first low-resolution image (F1) 107A to generate the first image data set (Set 1) 820A including an enhanced image 111A, a high-resolution low-frequency image 113A, a high-frequency image component 115A, or a combination thereof.

A motion based adjuster 840 is configured to receive the sequence of image data sets 820 and to generate a sequence of adjusted high-frequency image components 121 including a first adjusted high-frequency image component (H1) 121A, a second adjusted high-frequency image component (H2) 121B, and one or more additional adjusted high-frequency image components including an Nth adjusted high-frequency image component (HN) 121N. In a particular aspect, the motion based adjuster 840 includes the motion estimator 106 and the motion compensation based adjuster 108.

The combiner 114 is configured to combine the sequence of adjusted high-frequency image components 121 and the sequence of high-resolution low-frequency images 113 to generate a sequence of adjusted enhanced images 123 including a first adjusted enhanced image (E1) 123A, a second adjusted enhanced image (E2) 123B, and one or more additional adjusted enhanced images including an Nth adjusted enhanced image (EN) 123N.

During operation, the image generator 152 processes the first low-resolution image (F1) 107A to generate the first image data set (Set 1) 820A, and the motion based adjuster 840 processes the first image data set (Set 1) 820A to generate an adjusted high-frequency image component (H1) 121A. The combiner 114 combines the first high-resolution low-frequency image (L1) 113A and the adjusted high-frequency image component (H1) 121A to generate the first adjusted enhanced image 123A. The image generator 152 processes the second low-resolution image (F2) 107B to generate the second image data set (Set 2) 820B, and the motion based adjuster 840 processes the second image data set (Set 2) 820B to generate the second adjusted high-frequency image component (H2) 121B. The combiner 114 combines the second high-resolution low-frequency image (L2) 113B and the second adjusted high-frequency image component (H2) 121B to generate the second adjusted enhanced image 123B. Such processing continues, including the image generator 152 processing the Nth low-resolution image (FN) 107N to generate the Nth image data set (Set N) 820N, and the motion based adjuster 840 processes the Nth image data set (Set N) 820N to generate the Nth adjusted high-frequency image component (HN) 121N. The combiner 114 combines the Nth high-resolution low-frequency image (LN) 113N and the Nth adjusted high-frequency image component (HN) 121N to generate the second adjusted enhanced image 123N. By combining the adjusted high-frequency image components 121 with the high-resolution low-frequency images 113 to generate the adjusted enhanced images 123, visible jitter between the adjusted enhanced images 123 may be reduced.

Figure 9:
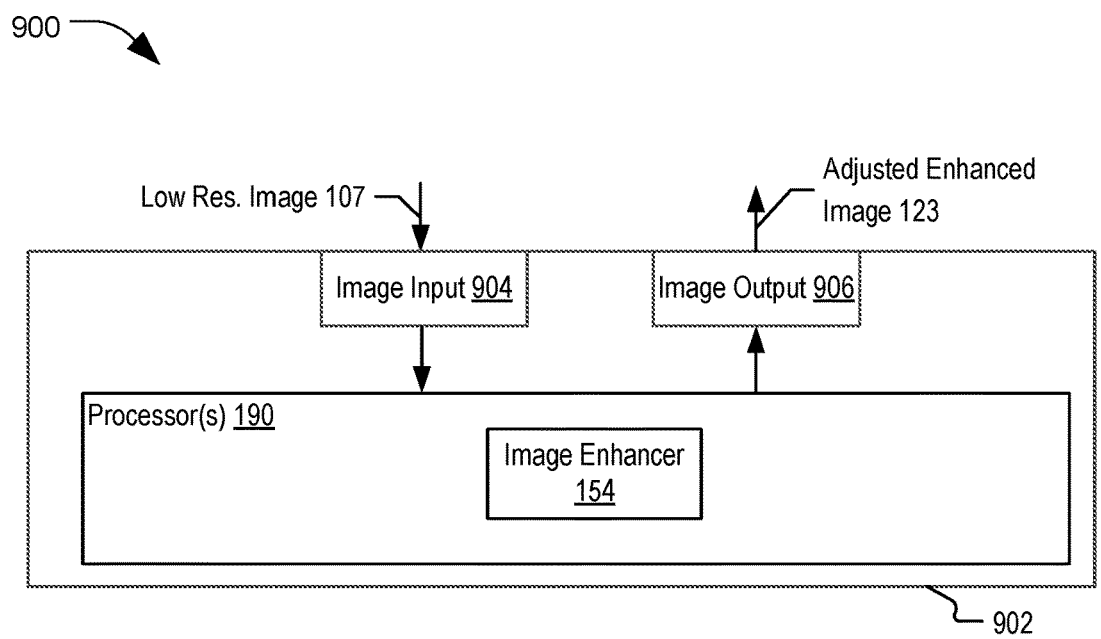
FIG. 9 illustrates an example of an integrated circuit operable to perform motion compensation for neural network enhanced images, in accordance with some examples of the present disclosure.
Figure 13:
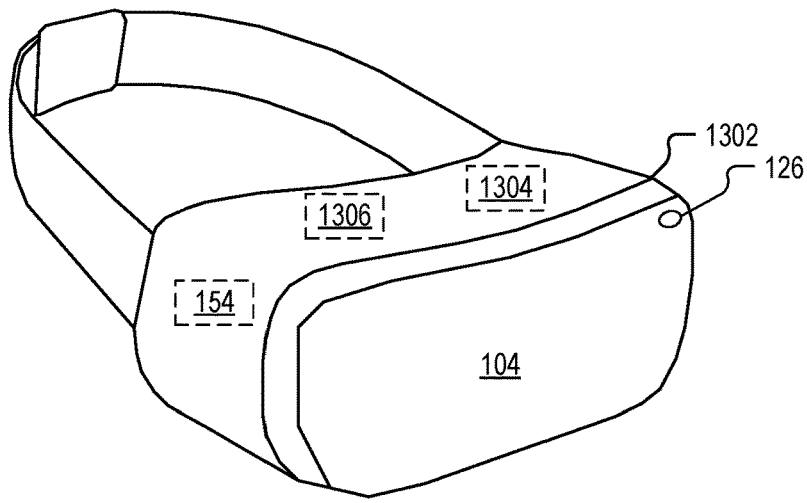
FIG. 13 is a diagram of a headset, such as a virtual reality, mixed reality, or augmented reality headset, operable to perform motion compensation for neural network enhanced images, in accordance with some examples of the present disclosure.
Figure 14:
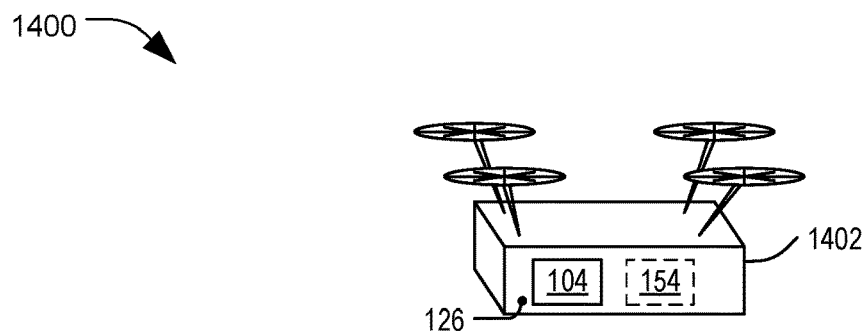
FIG. 14 is a diagram of a first example of a vehicle operable to perform motion compensation for neural network enhanced images, in accordance with some examples of the present disclosure.
Figure 15:
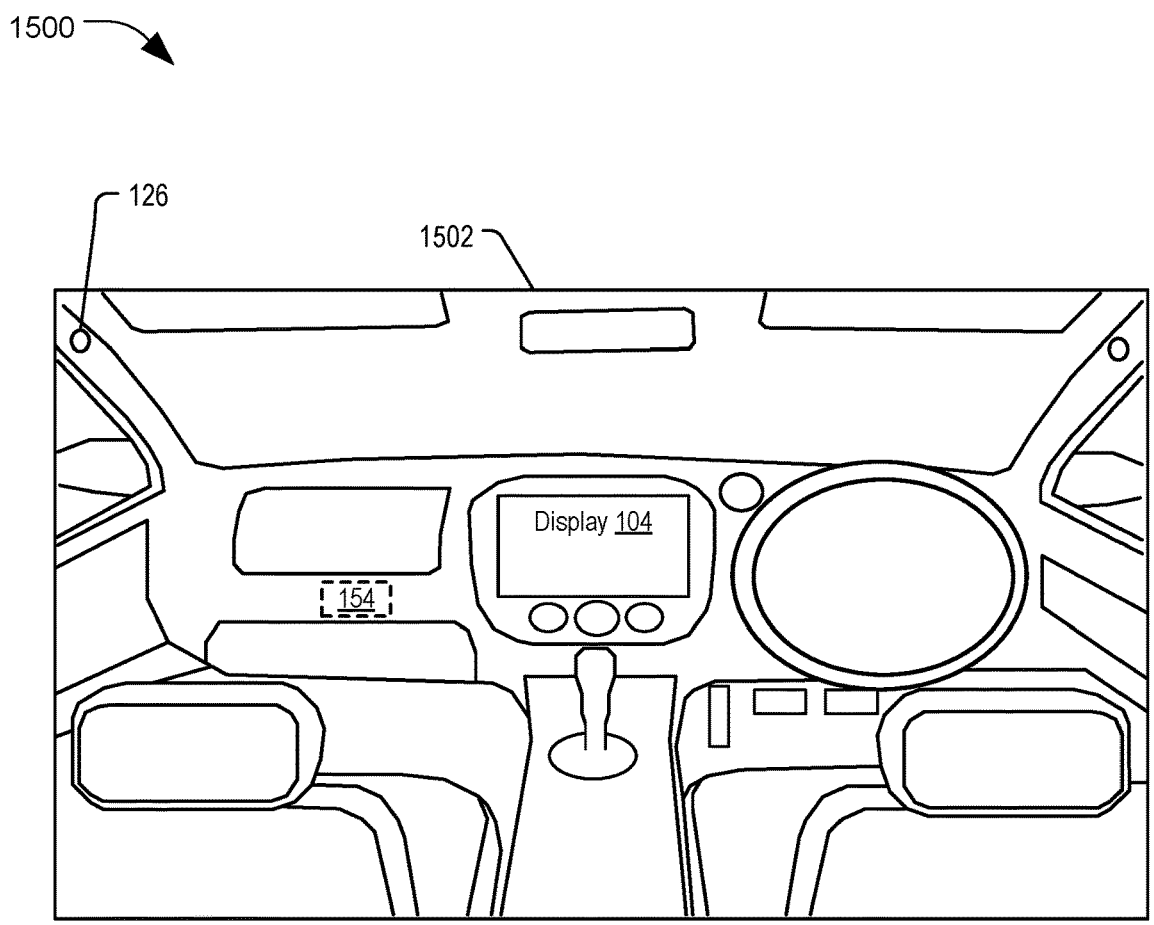
FIG. 15 is a diagram of a second example of a vehicle operable to perform motion compensation for neural network enhanced images, in accordance with some examples of the present disclosure.

FIG. 9 depicts an implementation 900 of the device 102 as an integrated circuit 902 that includes the one or more processors 190. Components of the one or more processors 190, including the image enhancer 154, are integrated in the integrated circuit 902. The integrated circuit 902 also includes an image input 904, such as one or more bus interfaces, to enable the low-resolution image 107 to be received for processing. The integrated circuit 902 also includes an image output 906, such as a bus interface, to enable sending of the adjusted enhanced image 123. The integrated circuit 902 enables implementation of motion compensation for neural network enhanced images as a component in a system, such as a mobile phone or tablet as depicted in FIG. 10, a wearable electronic device as depicted in FIG. 11, a camera as depicted in FIG. 12, a virtual reality, mixed reality, or augmented reality headset as depicted in FIG. 13, or a vehicle as depicted in FIG. 14 or FIG. 15.

Figure 10:
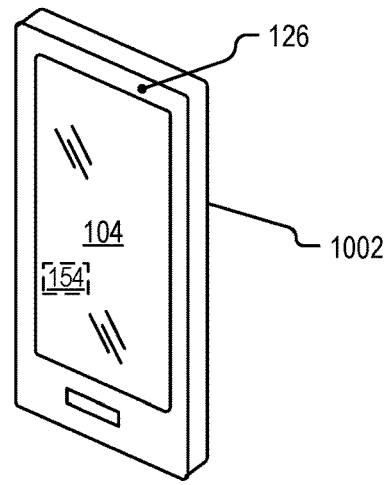
FIG. 10 is a diagram of a mobile device operable to perform motion compensation for neural network enhanced images, in accordance with some examples of the present disclosure.

FIG. 10 depicts an implementation 1000 in which the device 102 includes a mobile device 1002, such as a phone or tablet, as illustrative, non-limiting examples. The mobile device 1002 includes the camera 126 and the display device 104 (e.g., a display screen). Components of the one or more processors 190, including the image enhancer 154, are integrated in the mobile device 1002 and are illustrated using dashed lines to indicate internal components that are not generally visible to a user of the mobile device 1002. In a particular example, the image enhancer 154 operates to apply motion compensation for neural network enhanced images to generate adjusted enhanced images. The device 1002 also performs processes that use the adjusted enhanced images, such as to launch a graphical user interface or otherwise display the adjusted enhanced image 123 at the display device 104.

Figure 11:
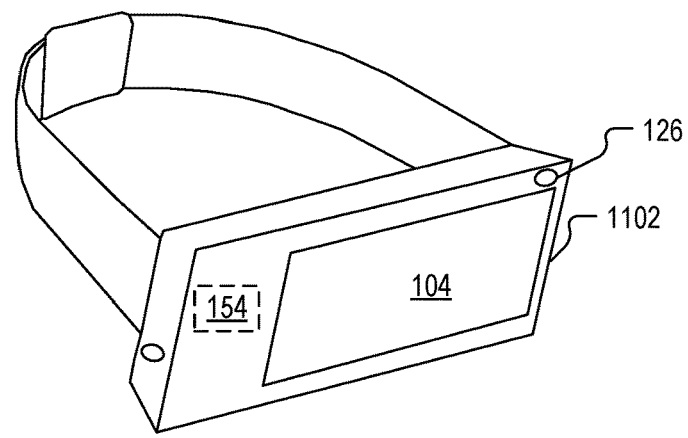
FIG. 11 is a diagram of a wearable electronic device operable to perform motion compensation for neural network enhanced images, in accordance with some examples of the present disclosure.

FIG. 11 depicts an implementation 1100 in which the device 102 includes a wearable electronic device 1102, illustrated as a "smart watch." The image enhancer 154, the display device 104 (e.g., a display screen), and the camera 126 are integrated into the wearable electronic device 1102. In a particular example, the image enhancer 154 operates to apply motion compensation on neural network enhanced images to generate adjusted enhanced images. The wearable electronic device 1102 also performs processes that use the adjusted enhanced images, such as to launch a graphical user interface or otherwise display the adjusted enhanced image 123 at the display device 104 of the wearable electronic device 1102. To illustrate, the wearable electronic device 1102 may include a display screen that is configured to display a notification based on the adjusted enhanced image 123 generated by the wearable electronic device 1102. In a particular example, the wearable electronic device 1102 includes a haptic device that provides a haptic notification (e.g., vibrates) in response to generating the adjusted enhanced image 123. For example, the haptic notification can cause a user to look at the wearable electronic device 1102 to see a displayed notification indicating the adjusted enhanced image 123. The wearable electronic device 1102 can thus alert a user with a hearing impairment or a user wearing a headset that the adjusted enhanced image 123 is displayed.

Figure 12:
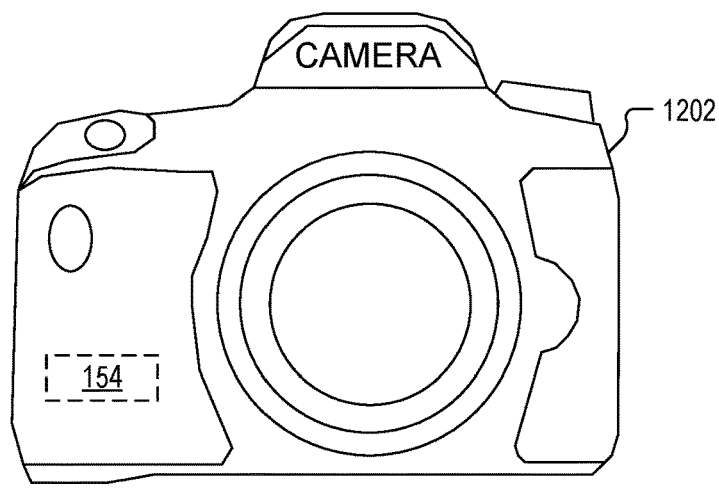
FIG. 12 is a diagram of a camera operable to perform motion compensation for neural network enhanced images, in accordance with some examples of the present disclosure.

FIG. 12 depicts an implementation 1200 in which the device 102 includes a portable electronic device that corresponds to a camera device 1202. In a particular aspect, the camera device 1202 corresponds to the camera 126 of FIG. 1. The image enhancer 154 is included in the camera device 1202. During operation, in response to receiving a verbal command, the camera device 1202 can execute operations responsive to spoken user commands, such as to capture the low-resolution image 107 and to generate the adjusted enhanced image 123, as an illustrative example. As another example, the camera device 1202 can capture a high-resolution image and use the scalable video encoder 600 of FIG. 6 to encode the high-resolution image and generate refinement data based on the adjusted enhanced image 123 in the predictor 650. The camera device 1202 can transmit the encoded image and the refinement data to a remote device.

FIG. 13 depicts an implementation 1300 in which the device 102 includes a portable electronic device that corresponds to a virtual reality, mixed reality, or augmented reality headset 1302. The image enhancer 154, the display device 104, the camera 126, or a combination thereof, are integrated into the headset 1302.

In a particular aspect, a GPU buffer 1304, a camera buffer 1306, or both, are integrated in the headset 1302. The camera buffer 1306 is configured to store images (e.g., the low resolution image 107) captured by the camera 126. The GPU buffer 1304 is configured to store images (e.g., the low resolution image 107) generated by a GPU of the headset 1302.

A visual interface device (e.g., the display device 104) is positioned in front of the user's eyes to enable display of augmented reality, mixed reality, or virtual reality images or scenes to the user while the headset 1302 is worn. In some implementations, the headset 1302 receives relatively low-resolution images (e.g., to conserve bandwidth, memory usage, processing requirements, or a combination thereof) and performs motion-adjusted, neural network based image enhancement to provide an improved user experience for a wearer of the headset 1302. In a particular example, the visual interface device is configured to generate and display the adjusted enhanced image 123.

FIG. 14 depicts an implementation 1400 in which the device 102 corresponds to, or is integrated within, a vehicle 1402, illustrated as a manned or unmanned aerial device (e.g., a package delivery drone). The image enhancer 154, the display device 104 (e.g., a display screen), the camera 126, or a combination thereof, are integrated into the vehicle 1402. In a particular aspect, the vehicle 1402 can generate and display the adjusted enhanced image 123, such as for assembly instructions for a delivered item.

FIG. 15 depicts another implementation 1500 in which the device 102 corresponds to, or is integrated within, a vehicle 1502, illustrated as a car. The vehicle 1502 includes the one or more processors 190 including the image enhancer 154. The vehicle 1502 also includes the display device 104, the camera 126, or both. In some implementations, user voice activity detection can be performed based on an audio signal received from one or more microphones, such as for a voice command from an authorized passenger. In a particular implementation, in response to receiving a verbal command identified as user speech, a voice activation system initiates one or more operations of the vehicle 1502 based on one or more detected keywords (e.g., "play movie," "display weather forecast," or another voice command), such as by generating the adjusted enhanced image 123 and providing the adjusted enhanced image 123 via the display device 104.

Figure 16:
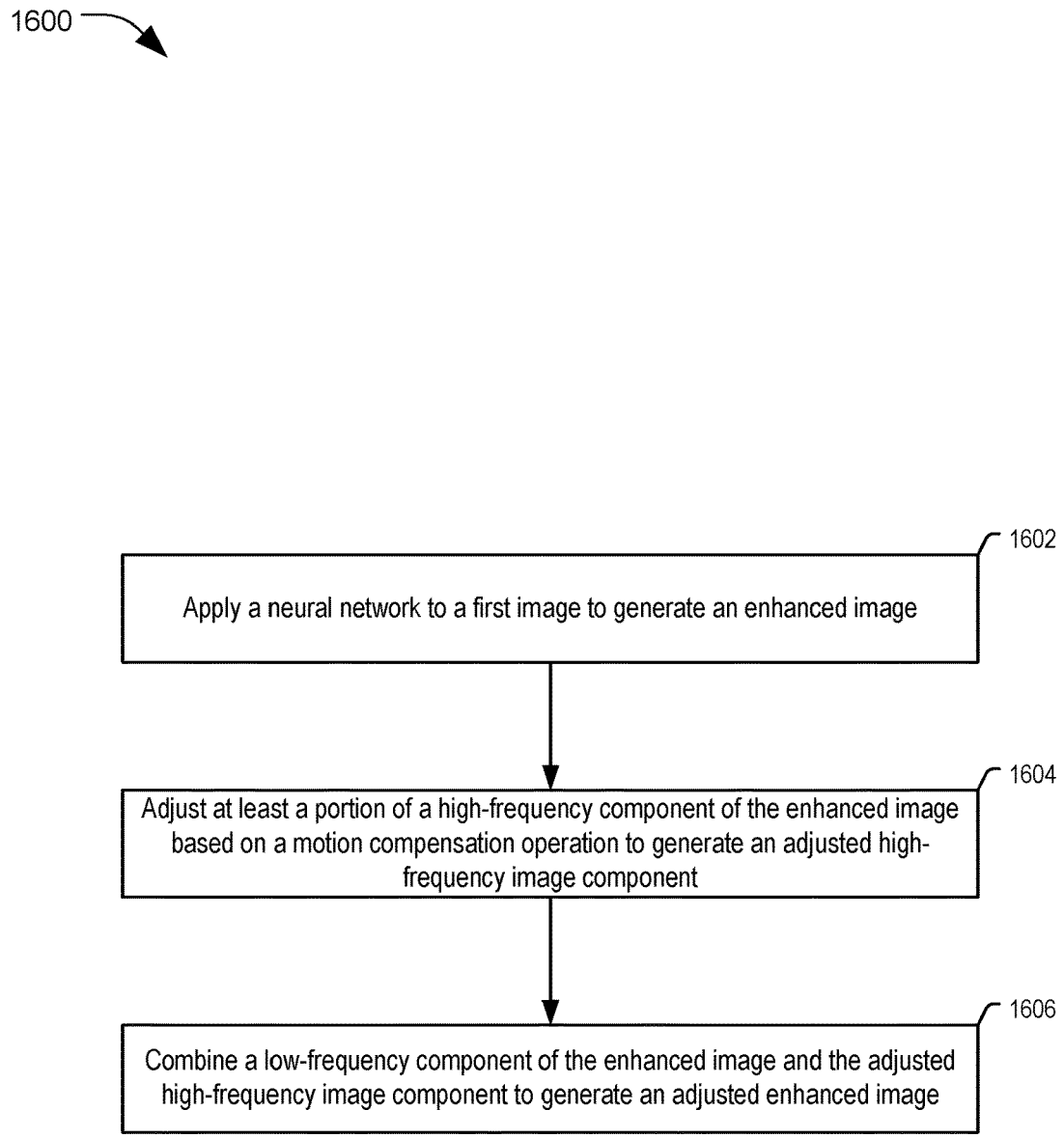
FIG. 16 is diagram of a particular implementation of a method of performing motion compensation for neural network enhanced images that may be performed by the device of FIG. 1, in accordance with some examples of the present disclosure.

Referring to FIG. 16, a particular implementation of a method 1600 of motion compensation for neural network enhanced images is shown. In a particular aspect, one or more operations of the method 1600 are performed by at least one of the image generator 152, the motion analyzer 112, the motion estimator 106, the motion compensation based adjuster 108, the combiner 114, the image enhancer 154, the one or more processors 190, the device 102, the system 100 of FIG. 1, or a combination thereof.

The method 1600 includes applying an enhancement neural network to a first image to generate an enhanced image, at 1602. For example, the image generator 152 of FIG. 1 applies the neural network 156 to the low-resolution image 107 to generate the enhanced image 111, as described with reference to FIG. 1.

The method 1600 also includes adjusting at least a portion of a high-frequency component of the enhanced image based on a motion compensation operation to generate an adjusted high-frequency image component, at 1604. For example, the motion compensation based adjuster 108 of FIG. 1 generates the predicted high-frequency image component 425 by performing a motion compensation operation on a previous high-frequency image component (e.g., the adjusted high-frequency image component 121A) and adjusts at least the high-frequency image component 115 of the enhanced image 111 based on the predicted high-frequency image component 425 to generate the adjusted high-frequency image component 121, as described with reference to FIGS. 1 and 4-5.

The method 1600 further includes combining a low-frequency component of the enhanced image and the adjusted high-frequency image component to generate an adjusted enhanced image, at 1606. For example, the combiner 114 combines the high-resolution low-frequency image 113 of the enhanced image 111 and the adjusted high-frequency image component 121 to generate the adjusted enhanced image 123, as described with reference to FIG. 1. The method 1600 reduces jitter by adjusting a neural network enhanced image based on motion compensation.

The method 1600 of FIG. 16 may be implemented by a field-programmable gate array (FPGA) device, an application-specific integrated circuit (ASIC), a processing unit such as a central processing unit (CPU), a digital signal processor (DSP), a graphics processing unit (GPU), a controller, another hardware device, firmware device, or any combination thereof. As an example, the method 1600 of FIG. 16 may be performed by a processor that executes instructions, such as described with reference to FIG. 17.

Figure 17:
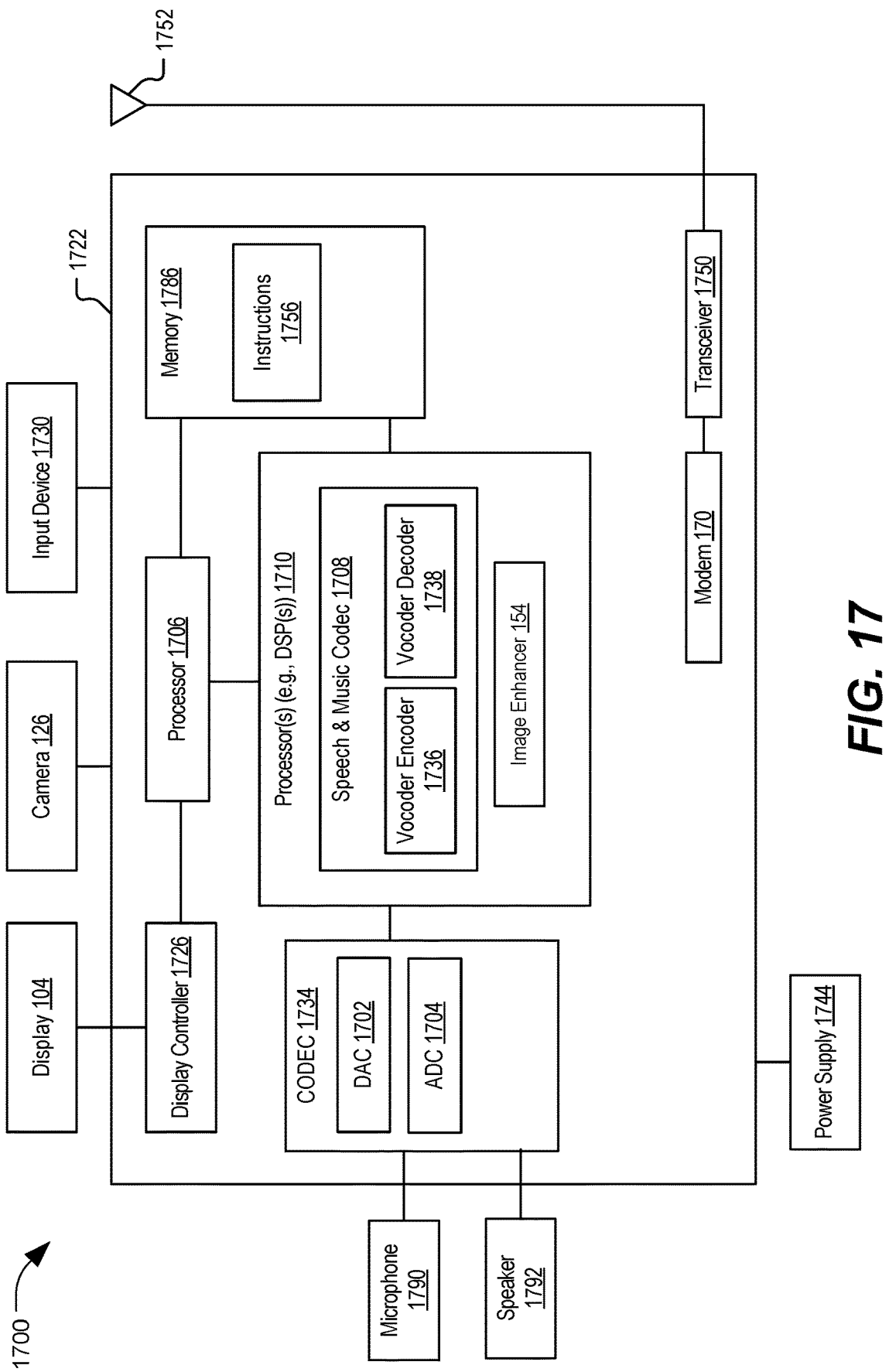
FIG. 17 is a block diagram of a particular illustrative example of a device that is operable to perform motion compensation for neural network enhanced images, in accordance with some examples of the present disclosure.

Referring to FIG. 17, a block diagram of a particular illustrative implementation of a device is depicted and generally designated 1700. In various implementations, the device 1700 may have more or fewer components than illustrated in FIG. 17. In an illustrative implementation, the device 1700 may correspond to the device 102. In an illustrative implementation, the device 1700 may perform one or more operations described with reference to FIGS. 1-16.

In a particular implementation, the device 1700 includes a processor 1706 (e.g., a central processing unit (CPU)). The device 1700 may include one or more additional processors 1710 (e.g., one or more DSPs). In a particular aspect, the one or more processors 190 of FIG. 1 corresponds to the processor 1706, the processors 1710, or a combination thereof. The processors 1710 may include a speech and music coder-decoder (CODEC) 1708 that includes a voice coder ("vocoder") encoder 1736, a vocoder decoder 1738, or both. The processors 1710 may include the image enhancer 154.

The device 1700 may include a memory 1786 and a CODEC 1734. The memory 1786 may include instructions 1756 that are executable by the one or more additional processors 1710 (or the processor 1706) to implement the functionality described with reference to the image enhancer 154. The device 1700 may include the modem 170 coupled, via a transceiver 1750, to an antenna 1752.

The device 1700 may include a display device 104 coupled to a display controller 1726. In a particular aspect, the device 1700 may be coupled to the camera 126. A speaker 1792 and a microphone 1790 may be coupled to the CODEC 1734. The CODEC 1734 may include a digital-to-analog converter (DAC) 1702, an analog-to-digital converter (ADC) 1704, or both. In a particular implementation, the CODEC 1734 may receive analog signals from the microphone 1790, convert the analog signals to digital signals using the analog-to-digital converter 1704, and provide the digital signals to the speech and music codec 1708. The speech and music codec 1708 may process the digital signals. In a particular implementation, the speech and music codec 1708 may provide digital signals to the CODEC 1734. The CODEC 1734 may convert the digital signals to analog signals using the digital-to-analog converter 1702 and may provide the analog signals to the speaker 1792.

In a particular implementation, the device 1700 may be included in a system-in-package or system-on-chip device 1722. In a particular implementation, the memory 1786, the processor 1706, the processors 1710, the display controller 1726, the CODEC 1734, and the modem 170 are included in a system-in-package or system-on-chip device 1722. In a particular implementation, an input device 1730 and a power supply 1744 are coupled to the system-on-chip device 1722. Moreover, in a particular implementation, as illustrated in FIG. 17, the display device 104, the camera 126, the input device 1730, the speaker 1792, the microphone 1790, the antenna 1752, and the power supply 1744 are external to the system-on-chip device 1722. In a particular implementation, each of the display device 104, the camera 126, the input device 1730, the speaker 1792, the microphone 1790, the antenna 1752, and the power supply 1744 may be coupled to a component of the system-on-chip device 1722, such as an interface or a controller.

The device 1700 may include a smart speaker, a speaker bar, a mobile communication device, a smart phone, a cellular phone, a laptop computer, a computer, a tablet, a personal digital assistant, a display device, a television, a gaming console, a music player, a radio, a digital video player, a digital video disc (DVD) player, a tuner, a camera, a navigation device, a vehicle, a headset, an augmented reality headset, a mixed reality headset, a virtual reality headset, an aerial vehicle, a home automation system, a voice-activated device, a wireless speaker and voice activated device, a portable electronic device, a car, a computing device, a communication device, an internet-of-things (IoT) device, a virtual reality (VR) device, a mixed reality (MR) device, an augmented reality (AR) device, a base station, a mobile device, or any combination thereof.

In conjunction with the described implementations, an apparatus includes means for applying a neural network to a first image to generate an enhanced image. For example, the means for applying the neural network can correspond to the image generator 152, the image enhancer 154, the one or more processors 190, the device 102, the system 100 of FIG. 1, the image generator 152A, the image enhancer 154A of FIG. 2A, the image enhancer 154B of FIG. 2B, the image generator 152B of FIG. 2C, the image enhancement predictor 640, the predictor 650, the scalable video encoder 600 of FIG. 6, the image enhancement analyzer 740, the image reconstructor 750, the scalable video decoder 700 of FIG. 7, the processors 1710, the processor 1706, the device 1700, one or more other circuits or components configured to apply a neural network to a first image to generate an enhanced image, or any combination thereof.

The apparatus also includes means for adjusting at least a portion of a high-frequency component of the enhanced image based on a motion compensation operation to generate an adjusted high-frequency image component. For example, the means for adjusting at least the portion of the high-frequency component of the enhanced image can correspond to the motion compensation based adjuster 108, the motion analyzer 112, the image enhancer 154, the one or more processors 190, the device 102, the system 100 of FIG. 1, the motion analyzer 112A, the image enhancer 154A of FIG. 2A, the motion analyzer 112B, the image enhancer 154B of FIG. 2B, the image enhancer 154C of FIG. 2C, the motion compensation based adjuster 108A, the temporal filter 412 of FIG. 4, the motion compensation based adjuster 108B of FIG. 5, the image enhancement predictor 640, the predictor 650, the scalable video encoder 600 of FIG. 6, the image enhancement analyzer 740, the image reconstructor 750, the scalable video decoder 700 of FIG. 7, the processors 1710, the processor 1706, the device 1700, one or more other circuits or components configured to adjust at least a portion of a high-frequency component of the enhanced image, or any combination thereof.

The apparatus also includes means for combining a low-frequency component of the enhanced image and the adjusted high-frequency image component to generate an adjusted enhanced image. For example, the means for combining can correspond to the combiner 114, the motion analyzer 112, the image enhancer 154, the one or more processors 190, the device 102, the system 100 of FIG. 1, the motion analyzer 112A, the image enhancer 154A of FIG. 2A, the motion analyzer 112B, the image enhancer 154B of FIG. 2B, the image enhancer 154C of FIG. 2C, the image enhancement predictor 640, the predictor 650, the scalable video encoder 600 of FIG. 6, the image enhancement analyzer 740, the image reconstructor 750, the scalable video decoder 700 of FIG. 7, the processors 1710, the processor 1706, the device 1700, one or more other circuits or components configured to combine a low-frequency component of the enhanced image and the adjusted high-frequency image component, or any combination thereof.

In some implementations, a non-transitory computer-readable medium (e.g., a computer-readable storage device, such as the memory 1786) includes instructions (e.g., the instructions 1756) that, when executed by one or more processors (e.g., the one or more processors 1710 or the processor 1706), cause the one or more processors to apply a neural network (e.g., the neural network 156) to a first image (e.g., the low-resolution image 107) to generate an enhanced image (e.g., the enhanced image 111). The instructions, when executed by the one or more processors, also cause the one or more processors to adjust at least a portion of a high-frequency component (e.g., the high-frequency image component 115) of the enhanced image based on a motion compensation operation to generate an adjusted high-frequency image component (e.g., the adjusted high-frequency image component 121). The instructions, when executed by the one or more processors, further cause the one or more processors to combine a low-frequency component (e.g., the high-resolution low-frequency image 113) of the enhanced image and the adjusted high-frequency image component to generate an adjusted enhanced image (e.g., the adjusted enhanced image 123).

Particular aspects of the disclosure are described below in sets of interrelated clauses:

According to Clause 1, a device includes: a memory configured to store instructions; and one or more processors configured to execute the instructions to: apply a neural network to a first image to generate an enhanced image; adjust at least a portion of a high-frequency component of the enhanced image based on a motion compensation operation to generate an adjusted high-frequency image component; and combine a low-frequency component of the enhanced image and the adjusted high-frequency image component to generate an adjusted enhanced image.

Clause 2 includes the device of Clause 1, wherein the one or more processors are configured to execute the instructions to use a temporal filter based on a previous image to adjust at least the portion of the high-frequency component of the enhanced image.

Clause 3 includes the device of Clause 2, wherein during processing of the first image, the motion compensation operation and the temporal filter operate based on a most recently generated previous adjusted enhanced image.

Clause 4 includes the device of any of Clause 1 to Clause 3, wherein the one or more processors are further configured to execute the instructions to: generate a low-resolution image of an input image; encode the low-resolution image to generate image encoding data; and local decode the image encoding data to generate the first image, the first image corresponding to a decoded low-resolution image.

Clause 5 includes the device of Clause 4, wherein the one or more processors are further configured execute the instructions to: generate refinement data based on a comparison between the adjusted enhanced image and the input image; and initiate transmission of the image encoding data and the refinement data to a second device.

Clause 6 includes the device of Clause 5, wherein the one or more processors are configured to execute the instructions to: generate a refinement image based on the comparison between the adjusted enhanced image and the input image; apply a transform to the refinement image to generate a transformed refinement image; apply quantization to the transformed refinement image to generate quantized refinement data; and apply entropy coding to the quantized refinement data to generate the refinement data.

Clause 7 includes the device of any of Clause 1 to Clause 3, wherein the one or more processors are further configured to execute the instructions to decode image encoding data to generate the first image, the first image corresponding to a decoded low-resolution image.

Clause 8 includes the device of Clause 7, further including a modem configured to receive a bitstream that includes the image encoding data.

Clause 9 includes the device of any of Clause 1 to Clause 8, wherein the one or more processors are further configured to execute the instructions to apply refinement data to the adjusted enhanced image to generate a refined enhanced image.

Clause 10 includes the device of Clause 9, further including a modem configured to receive a bitstream that includes the refinement data.

Clause 11 includes the device of any of Clause 1 to Clause 10, further including a display device configured to display an output image that is based on the adjusted enhanced image.

Clause 12 includes the device of Clause 11, wherein the display device includes a mixed reality (MR) display device.

Clause 13 includes the device of Clause 11 or Clause 12, wherein the display device includes a virtual reality (VR) display device.

Clause 14 includes the device of any of Clause 11 to Clause 13, wherein the display device includes an augmented reality (AR) display device.

Clause 15 includes the device of any of Clause 1 to Clause 6 or any of Clause 11 to Clause 14, wherein the one or more processors are further configured to execute the instructions to receive the first image from a camera.

Clause 16 includes the device of Clause 1 to Clause 6 or any of Clause 11 to Clause 14, wherein the one or more processors are further configured to execute the instructions to receive the first image from a graphic processing unit (GPU).

Clause 17 includes the device of any of Clause 1 to Clause 6 or any of Clause 11 to Clause 14, wherein the one or more processors are further configured to execute the instructions to retrieve the first image from a camera buffer.

Clause 18 includes the device of any of Clause 1 to Clause 6 or any of Clause 11 to Clause 14, wherein the one or more processors are further configured to execute the instructions to retrieve the first image from a graphics processing unit (GPU) buffer.

Clause 19 includes the device of any of Clause 1 to Clause 6 or any of Clause 11 to Clause 14, wherein the one or more processors are further configured to execute the instructions to retrieve the first image from a camera buffer or a graphics processing unit (GPU) buffer.

Clause 20 includes the device of any of Clause 1 to Clause 6 or any of Clause 11 to Clause 19, wherein the one or more processors are further configured to execute the instructions to: receive an image enhancement request from an application; and retrieve, based on a type of the application, the first image from one of a camera buffer or a graphics processing unit (GPU) buffer.

Clause 21 includes the device of any of Clause 1 to Clause 20, wherein the one or more processors are further configured execute the instructions to determine whether to generate the adjusted high-frequency image component based on whether a motion associated with the first image is greater than threshold motion.

According to Clause 22, a method includes: applying, at a device, a neural network to a first image to generate an enhanced image; adjusting, at the device, at least a portion of a high-frequency component of the enhanced image based on a motion compensation operation to generate an adjusted high-frequency image component; and combining, at the device, a low-frequency component of the enhanced image and the adjusted high-frequency image component to generate an adjusted enhanced image.

Clause 23 includes the method of Clause 22, further including using, at the device, a temporal filter based on a previous image to adjust at least the portion of the high-frequency component of the enhanced image.

Clause 24 includes the method of Clause 23, wherein during processing of the first image, the motion compensation operation and the temporal filter operate based on a most recently generated previous adjusted enhanced image.

Clause 25 includes the method of any of Clause 22 to Clause 24, further including: generating, at the device, a low-resolution image of an input image; encoding, at the device, the low-resolution image to generate image encoding data; and local decoding, at the device, the image encoding data to generate the first image, the first image corresponding to a decoded low-resolution image.

Clause 26 includes the method of Clause 25, further including: generating, at the device, refinement data based on a comparison between the adjusted enhanced image and the input image; and initiating transmission of the image encoding data and the refinement data from the device to a second device.

Clause 27 includes the method of Clause 26, further including: generating, at the device, a refinement image based on the comparison between the adjusted enhanced image and the input image; applying, at the device, a transform to the refinement image to generate a transformed refinement image; applying, at the device, quantization to the transformed refinement image to generate quantized refinement data; and applying, at the device, entropy coding to the quantized refinement data to generate the refinement data.

Clause 28 includes the method of any of Clause 22 to Clause 25, further including decoding, at the device, image encoding data to generate the first image, the first image corresponding to a decoded low-resolution image.

Clause 29 includes the method of any of Clause 22 to Clause 28, further including applying, at the device, refinement data to the adjusted enhanced image to generate a refined enhanced image.

Clause 30 includes the method of any of Clause 22 to Clause 27, further including receiving the first image from a camera.

Clause 31 includes the method of any of Clause 22 to Clause 27, further including receiving the first image from a graphic processing unit (GPU).

Clause 32 includes the method of any of Clause 22 to Clause 27, further including retrieving, at the device, the first image from a camera buffer.

Clause 33 includes the method of any of Clause 22 to Clause 27, further including retrieving, at the device, the first image from a graphics processing unit (GPU) buffer.

Clause 34 includes the method of any of Clause 22 to Clause 27, further including retrieving, at the device, the first image from one of a camera buffer or a graphics processing unit (GPU) buffer.

Clause 35 includes the method of any of Clause 22 to Clause 27, further including: receiving, at the device, an image enhancement request from an application; and retrieving, based on a type of the application, the first image from one of a camera buffer or a graphics processing unit (GPU) buffer.

Clause 36 includes the method of any of Clause 22 to Clause 35, further including determining whether to generate the adjusted high-frequency image component based on whether a motion associated with the first image is greater than threshold motion.

Clause 37 includes the method of any of Clause 22 to Clause 36, further including receiving, via a modem, a bitstream that includes the image encoding data.

Clause 38 includes the method of any of Clause 22 to Clause 37, further including receiving, via a modem, a bitstream that includes the refinement data.

Clause 39 includes the method of any of Clause 22 to Clause 38, further including providing an output image to a display device, the output image based on the adjusted enhanced image.

Clause 40 includes the method of Clause 39, wherein the display device includes a mixed reality (MR) display device.

Clause 41 includes the method of Clause 39 or Clause 40, wherein the display device includes a virtual reality (VR) display device.

Clause 42 includes the method of any of Clause 39 to Clause 41, wherein the display device includes an augmented reality (AR) display device.

According to Clause 43, a device includes: a memory configured to store instructions; and a processor configured to execute the instructions to perform the method of any of Clause 22 to Clause 42.

According to Clause 44, a non-transitory computer-readable medium stores instructions that, when executed by a processor, cause the processor to perform the method of any of Clause 22 to Clause 42.

According to Clause 45, an apparatus includes means for carrying out the method of any of Clause 22 to Clause 42.

According to Clause 46, a non-transitory computer-readable medium stores instructions that, when executed by one or more processors, cause the one or more processors to: apply a neural network to a first image to generate an enhanced image; adjust at least a portion of a high-frequency component of the enhanced image based on a motion compensation operation to generate an adjusted high-frequency image component; and combine a low-frequency component of the enhanced image and the adjusted high-frequency image component to generate an adjusted enhanced image.

Clause 47 includes the non-transitory computer-readable medium of Clause 46, wherein the instructions, when executed by the one or more processors, further cause the one or more processors to use a temporal filter based on a previous image to adjust at least the portion of the high-frequency component of the enhanced image.

According to Clause 48, an apparatus includes: means for applying a neural network to a first image to generate an enhanced image; means for adjusting at least a portion of a high-frequency component of the enhanced image based on a motion compensation operation to generate an adjusted high-frequency image component; and means for combining a low-frequency component of the enhanced image and the adjusted high-frequency image component to generate an adjusted enhanced image.

Clause 49 includes the apparatus of Clause 48, wherein the means for applying, the means for adjusting, and the means for combining are integrated into at least one of a portable electronic device, a car, a vehicle, a camera, a computing device, a communication device, an internet-of-things (IoT) device, a virtual reality (VR) device, a mixed reality (MR) device, an augmented reality (AR) device, or a combination thereof.

Those of skill would further appreciate that the various illustrative logical blocks, configurations, modules, circuits, and algorithm steps described in connection with the implementations disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, such implementation decisions are not to be interpreted as causing a departure from the scope of the present disclosure.

The steps of a method or algorithm described in connection with the implementations disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor may read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed aspects is provided to enable a person skilled in the art to make or use the disclosed aspects. Various modifications to these aspects will be readily apparent to those skilled in the art, and the principles defined herein may be applied to other aspects without departing from the scope of the disclosure. Thus, the present disclosure is not intended to be limited to the aspects shown herein but is to be accorded the widest scope possible consistent with the principles and novel features as defined by the following claims.

What is claimed is:

1. A device comprising:
a memory configured to store an enhanced image; and
one or more processors configured to:
apply a neural network to a first image to generate the enhanced image;

adjust at least a portion of a high-frequency component of the enhanced image, based on a motion associated with the first image being greater than a threshold motion, to generate an adjusted high-frequency image component; and combine a low-frequency component of the enhanced image and the adjusted high-frequency image component to generate an adjusted enhanced image.

2. The device of claim 1, wherein the one or more processors are configured to use a temporal filter based on a previous image to adjust at least the portion of the high-frequency component of the enhanced image.

3. The device of claim 2, wherein when the one or more processors are configured to process the first image, the motion compensation operation and the temporal filter operate based on a most recently generated previous adjusted enhanced image.

4. The device of claim 1, wherein the one or more processors are configured to:
generate a low-resolution image of an input image;
encode the low-resolution image to generate image encoding data; and
local decode the image encoding data to generate the first image, the first image corresponding to a decoded low-resolution image.

5. The device of claim 4, wherein the one or more processors are configured to:
generate refinement data based on a comparison between the adjusted enhanced image and the input image; and
initiate transmission of the image encoding data and the refinement data to a second device.

6. The device of claim 5, wherein the one or more processors are configured to:
generate a refinement image based on the comparison between the adjusted enhanced image and the input image;
apply a transform to the refinement image to generate a transformed refinement image;
apply quantization to the transformed refinement image to generate quantized refinement data; and
apply entropy coding to the quantized refinement data to generate the refinement data.

7. The device of claim 1, wherein the one or more processors are configured to decode image encoding data to generate the first image, the first image corresponding to a decoded low-resolution image.

8. The device of claim 7, further comprising a modem configured to receive a bitstream that includes the image encoding data.

9. The device of claim 1, wherein the one or more processors are configured to apply refinement data to the adjusted enhanced image to generate a refined enhanced image.

10. The device of claim 9, further comprising a modem configured to receive a bitstream that includes the refinement data.

11. The device of claim 1, further comprising a display device configured to display an output image that is based on the adjusted enhanced image.

12. The device of claim 11, wherein the display device includes a mixed reality (MR) display device, a virtual reality (VR) display device, an augmented reality (AR) display device, or a combination thereof.

13. The device of claim 1, wherein the one or more processors are configured to execute the instructions to receive the first image from a camera.

14. The device of claim 1, wherein the one or more processors are configured to receive the first image from a graphic processing unit (GPU).

15. The device of claim 1, wherein the one or more processors are configured to execute the instructions to retrieve the first image from one of a camera buffer or a graphics processing unit (GPU) buffer.

16. The device of claim 1, wherein the one or more processors are configured to:
receive an image enhancement request from an application; and
retrieve, based on a type of the application, the first image from one of a camera buffer or a graphics processing unit (GPU) buffer.

17. A method comprising:
applying, at a device, a neural network to a first image to generate an enhanced image;
adjusting, at a device, at least a portion of a high-frequency component of the enhanced image, based on a motion associated with the first image being greater than a threshold motion, to generate an adjusted high-frequency image component; and
combining, at the device, a low-frequency component of the enhanced image and the adjusted high-frequency image component to generate an adjusted enhanced image.

18. The method of claim 17, further comprising using, at the device, a temporal filter based on a previous image to adjust at least the portion of the high-frequency component of the enhanced image.

19. The method of claim 18, wherein during processing of the first image, the motion compensation operation and the temporal filter operate based on a most recently generated previous adjusted enhanced image.

20. The method of claim 17, further comprising:
generating, at the device, a low-resolution image of an input image;
encoding, at the device, the low-resolution image to generate image encoding data; and
local decoding, at the device, the image encoding data to generate the first image, the first image corresponding to a decoded low-resolution image.

21. The method of claim 20, further comprising:
generating, at the device, refinement data based on a comparison between the adjusted enhanced image and the input image; and
initiating transmission of the image encoding data and the refinement data from the device to a second device.

22. The method of claim 17, further comprising decoding, at the device, image encoding data to generate the first image, the first image corresponding to a decoded low-resolution image.

23. The method of claim 17, further comprising applying, at the device, refinement data to the adjusted enhanced image to generate a refined enhanced image.

24. The method of claim 17, further comprising retrieving, at the device, the first image from one of a camera buffer or a graphics processing unit (GPU) buffer.

25. The method of claim 17, further comprising:
receiving, at the device, an image enhancement request from an application; and
retrieving, based on a type of the application, the first image from one of a camera buffer or a graphics processing unit (GPU) buffer.

26. A non-transitory computer-readable medium storing instructions that, when executed by one or more processors, cause the one or more processors to:
- apply a neural network to a first image to generate an enhanced image;
- adjust at least a portion of a high-frequency component of the enhanced image, based on a motion associated with the first image being greater than a threshold motion, to generate an adjusted high-frequency image component; and
- combine a low-frequency component of the enhanced image and the adjusted high-frequency image component to generate an adjusted enhanced image.

27. The non-transitory computer-readable medium of claim 26, wherein the instructions, when executed by the one or more processors, further cause the one or more processors to use a temporal filter based on a previous image to adjust at least the portion of the high-frequency component of the enhanced image.

28. An apparatus comprising:
- means for applying a neural network to a first image to generate an enhanced image;
- means for adjusting at least a portion of a high-frequency component of the enhanced image, based on a motion associated with the first image being greater than a threshold motion, to generate an adjusted high-frequency image component; and
- means for combining a low-frequency component of the enhanced image and the adjusted high-frequency image component to generate an adjusted enhanced image.

29. The apparatus of claim 28, wherein the means for applying, the means for adjusting, and the means for combining are integrated into at least one of a portable electronic device, a car, a vehicle, a camera, a computing device, a communication device, an internet-of-things (IoT) device, a virtual reality (VR) device, a mixed reality (MR) device, an augmented reality (AR) device, or a combination thereof.

* * * * *